(12) United States Patent
Nagao

(10) Patent No.: US 8,275,730 B2
(45) Date of Patent: Sep. 25, 2012

(54) INFORMATION PROCESSING APPARATUS, INFORMATION PROCESSING METHOD, AND COMPUTER PROGRAM PRODUCT FOR REDUCING STATES IN A DETERMINISTIC FINITE STATE AUTOMATON

(75) Inventor: Manabu Nagao, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 12/558,761

(22) Filed: Sep. 14, 2009

(65) Prior Publication Data

US 2010/0082522 A1    Apr. 1, 2010

(30) Foreign Application Priority Data

Sep. 26, 2008  (JP) .................................. 2008-249029

(51) Int. Cl.
*G06F 17/00* (2006.01)
*G06F 7/60* (2006.01)
*G06F 7/38* (2006.01)

(52) U.S. Cl. ................................ 706/45; 703/2; 326/46

(58) Field of Classification Search ........................ None
See application file for complete search history.

(56) References Cited

U.S. PATENT DOCUMENTS
2007/0130140 A1 * 6/2007 Cytron et al. ..................... 707/6

OTHER PUBLICATIONS

John E. Hopcroft et al., "Equivalence and Minimization of Automata". Introduction to Automata Theory, Languages, and Computation, Second Edition, Chapter 4, Section 4, 2000, pp. 154-165.
Alfred V. Aho et al., "Optimization of DFA-Based Pattern Matchers", Compilers Principles, Techniques, and Tools, Chapter 3, Section 9, 1985, ISBN 0-201-10088-6, pp. 141-144.
John Hopcroft, "An n Log n Algorithm for Minimizing States in a Finite Automaton", Theory of Machines and Computations, Acadamic Press, New York, 1971, pp. 189-196.
Bruce W. Watson, "An Incremental DFA Minimization Algorithm", Proceedings Second International Workshop on Finite State Methods in Natural Language Processing (FSMNLP 2001), Jun. 4, 2001, 9 pages.
Bruce W. Watson et al., "An Efficient Incremental DFA Minimization Algorithm", Natural Language Engineering 9(1), 2003, pp. 49-64.

* cited by examiner

*Primary Examiner* — Alan Chen
(74) *Attorney, Agent, or Firm* — Oblon, Spivak, McClelland, Maier & Neustadt, L.L.P.

(57) ABSTRACT

States included in a deterministic finite automaton are classified into states having the same input symbols associated with outgoing transitions and the same finality, and a calculates an intersection set between each of the state sets and a set of transition destination states which is obtained by translating each of states included in the state sets, until the number of states included in the intersection set becomes equal to one, while regarding the set of the transition destination states for each of the input symbol included in the intersection set as new state sets, and plural indistinguishable states are merged into one state by tracing a route in a reverse direction to a transition direction, when the number of states has become equal to one.

10 Claims, 23 Drawing Sheets

FIG.4

```
        simin(A)
N201    S←φ, D←φ
N202    G←create_class(A)
N203    while G≠φ
N204      let g:g∈G
N205      (G, ·)←search_equiv(add_path_index(g), G)
```

FIG.5

```
        create_class(A)
N211    G←φ, C←φ
N212    foreach q∈Q
N213      Σ_q←{label(e)|e∈E, p(e)=q}
N214      C[(q∈F, Σ_q)]←C[(q∈F, Σ_q)]∪{q}
N215    foreach((·, ·), g)∈C
N216      if|g|≥2
N217        G←G∪{g}
N218    return G
```

FIG.6A

```
       search_equiv(γ, G)
N221    g←{q|(q, i)∈γ}
N222    Σ_g←{label(e)|e∈E, q∈g, p(e)=q}
N223    Ψ_sc←φ
N224    if Σ_g=φ
N225        g_erase←merge_states({g}, φ)
N226    else
N227        H←φ, Y_sc←φ
N228        push(S, γ)
N229        foreach σ∈Σ_g
N230            Ψ_sc←φ, Ψ_nsc←φ, η←φ
N231            γ_n←next_gamma(γ, σ)
N232            if γ_n∉S
N233                foreach g'∈G
N234                    γ_ni←{(q, i)∈γ_n|q∈g'}
N235                    if |γ_ni|>1
N236                        (G, Ψ_nsct)search_equiv(γ_ni, G)
N237                        Ψ_nsc←Ψ_nsc∪Ψ_nsct
N238                g_n←{q∈Q|e∈E, p(e)∈g, q=n(e), σ=label(e)}
N239                foreach q_n∈g_n
N240                    g_s←{q∈g|e∈E, q=p(e), q_n=n(e), σ=label(e)}
N241                    if |g_s|>1
N242                        η←η∪{g_s}
N243                        Ψ_sc←Ψ_sc∪{({(q, q)|q∈g_s}, |S|)}
N244                foreach (Ψ_nsc, x_level)∈Ψ_nsc
N245                    Ψ_sc←{(q, q_d)|q∈g, e∈E, (q_s, q_d)∈Ψ_nsc, q=p(e), q_s=n(e), σ=label(e)}
N246                    if x_level=|S|
N247                        η←η∪{{q|(q, q_d)∈Ψ_sc}}
N248                    Ψ_sc←Ψ_sc∪{((Ψ_sc, x_level)}
N249            else
N250                Ψ_sc←{(q, q_n)|q∈g, (q_n, i)∈γ_n, e∈E, q=p(e), q_n=n(e), σ=label(e)}
N251                Ψ_sc←{(Ψ_sc, level(S, γ_n))}
N252                if γ=γ_n
N253                    η←{g}
N254            Y_sc←Y_sc∪{Ψ_sc}, H←H∪{η}
```

FIG.6B

N255    $G_{share} \leftarrow \bigcup_{g_s \in \eta} search\_sharable\_state(g_s, H\setminus\{\eta\})$, where $\eta \in H$ N256    $g_{erase} \leftarrow merge\_states(G_{share}, D[|S|])$ N257    $Y_{sc} \leftarrow \bigcup_{\Psi \in Y_{sc}} \{\{\bigcup_{\Psi(\Psi, x_{level}) \in \Psi} \{(\{(q_s, q_d) \in \Psi | q \notin g_{erase}\}, x_{level})\}\}\}$ N258    $\Psi_{sc} \leftarrow \bigcup_{(\Psi, x_{level}) \in \Psi} search\_sharable\_state\_candidate(\Psi, x_{level}, Y_{sc}\setminus\{\Psi\})$, where $\Psi \in Y_{sc}$ N259    $\Psi_{sc} \leftarrow \{(\Psi, x_{level}) \in \Psi_{sc} | x_{level} < |S|\}$ N260    foreach $(\Psi_{sc}, x_{level}) \in \Psi_{sc}$ N261        $D[x_{level}] \leftarrow D[x_{level}] \cup \{\Psi_{sc}\}$ N262    foreach $(\Psi_{sc}, x_{level}) \in \Psi_{sc}$ N263        foreach $d \in D[|S|]$ N264            $d_p \leftarrow \bigcup_{(q_s, q_d) \in \Psi_{sc}} \{(q'_s, q_d) | (q'_s, q'_d) \in d, q'_d = q_s\}$ N265            $D[x_{level}] \leftarrow D[x_{level}] \cup \{d_p\}$ N266    $D[|S|] \leftarrow \phi$ N267    pop(S)

N268    if $\Psi_{sc} = \phi$

N269        $G \leftarrow G\setminus\{g\}$

N270    $G' \leftarrow \bigcup_{g' \in G} \{g_r | g_r = g'\setminus g_{erase}, |g_r| > 1\}$ N271    return($G'$, $\Psi_{sc}$)

FIG.7

```
      next_gamma(γ, σ)
N281    γ_n ← φ
N282    foreach(q, i) ∈ γ
N283      γ_n ← γ_n ∪ {(q_n, i) | e∈E, q=p(e), q_n=n(e), σ=label(e), (q_n, ·) ∉ γ_n}
N284    return γ_n
```

FIG.8

```
      search_sharable_state(g_start, H)
N291    if H=φ
N292      return {g_start}
N293    let η : η ∈ H
N294    G_s ← φ
N295    foreach g' ∈ η
N296      g_is ← g_start ∩ g'
N297      if |g_is| > 1
N298        G_s ← G_s ∪ search_sharable_state(g_is, H\{η})
N299    return G_s
```

FIG. 9

```
          merge_states(G_share, D_elm)
N301      Q_e ← φ
N302      foreach g_s ∈ G_share
N303        let r:r ∈ g_s
N304        foreach q_e ∈ (g_s\{r})
N305          merge(r, q_e)
N306          Q_e ← Q_e ∪ {q_e}
N307      foreach Ψ ∈ D_elm
N308        g ← {q_s|(q_s, q_d) ∈ Ψ, q_d ∈ g_s}
N309        if|g|>1
N310          let r':r' ∈ g
N311          foreach q_e ∈ (g\{r'})
N312            merge(r' q_e)
N313            Q_e ← Q_e ∪ {q_e}
N314      return Q_e
```

FIG. 10

```
          search_shareble_state_candidate(Ψ_start, x_start, Y)
N321      if Y = φ
N322        return{(Ψ_start, x_start)}
N323      let Ψ:Ψ ∈ Y
N324      Ψ_s ← φ
N325      foreach(Ψ, x_level) ∈ Ψ
N326        if x_start < x_level
N327          Ψ_is ← {(q_s, q_d) ∈ Ψ_start|(q_s, ·) ∈ Ψ}
N328        else
N329          Ψ_is ← {(q_s, q_d) ∈ Ψ|(q_s, ·) ∈ Ψ_start}
N330        if| Ψ_is|>1
N331          x_is ← min(x_start, x_level)
N332          Ψ_s ← Ψ_s ∪ search_sharable_state_candidate(Ψ_is, x_is, Y\{Ψ})
N333      return Ψ_s
```

FIG.27 search_equiv 2($\gamma$, G)
N401   g←{q|(q, i)∈$\gamma$}
N402   $\Sigma_g$←{label(e)|e∈E, q∈g, p(e)=q}
N403   $\Psi_{sc}$←$\phi$
N404   if $\Sigma_g$=$\phi$
N405     $g_{erase}$←merge_states({g}, $\phi$)
N406   else
N407     H←$\phi$, $Y_{sc}$←$\phi$
N408     push(S, $\gamma$)
N409     foreach $\sigma$∈$\Sigma_g$
N410       $\Psi_{sc}$←$\phi$, $\Psi_{nsc}$←$\phi$, $\eta$←$\phi$
N411       $\gamma_n$←next_gamma($\gamma$, $\sigma$)
N412       $b_{found}$←false
N413       if |$\gamma$|=|$\gamma_n$|
N414         ($\Psi_n$, $x_{level}$)←find_src_in_D($\gamma_n$, D)
N415         $\Psi$←{(q, $q_d$)|e∈E, q∈g, ($q_s$, $q_d$)∈$\Psi_n$, q=p(e), $q_s$=n(e), $\sigma$=label(e)}
N416         $\gamma_d$←{($q_d$, i)|(q, i)∈$\gamma$, (q, $q_d$)∈$\Psi$}
N417         if $\gamma_d$∈S
N418           $\Psi_{sc}$←$\Psi_{sc}$∪{($\Psi$, $x_{level}$)}
N419           if $x_{level}$=|S|
N420             $\eta$←$\eta$∪{{q|(q, $q_d$)∈$\Psi$}}
N421           $b_{found}$←true
N422       if $b_{found}$←false
N423         (N232 TO N253 OF "search_equiv")
N424       $Y_{sc}$←$Y_{sc}$∪{$\Psi_{sc}$}, H←H∪{$\eta$}
N425     (N255 TO N267 OF "search_equiv")
N426   (N268 TO N271 OF "search_equiv")

```
find_src_in_D($\gamma_n$, D)
N431   $g_n \leftarrow \{q|(q, i) \in \gamma_n\}$
N432   foreach($x_{level}$, y)∈D
N433     foreach $\Psi \in y$
N434       $g_s \leftarrow \{q_s|(q_s, q_d) \in \Psi\}$
N435       if $g_n = g_s$
N436         return($\Psi$, $x_{level}$)
N437   return($\phi$, 0)
```

```
        create_class(A)
N501    G←φ, C←φ
N502    foreach q∈Q
N503        Σ_q←{label(e)|e∈E, p(e)=q}
N504        C[(Σ_q, ρ(q))]←C[(Σ_q, ρ(q))]∪{q}
N505    foreach ((·, ·), g)∈C
N506        if |g|≥2
N507            G←G∪{g}
N508    return G
```

```
        simin_ac(A)
N601    G←create_class(A)
N602    while G≠φ
N603        let g:g∈G
N604        G←search_equiv_ac(g, G)
```

FIG.36

```
     search_equiv_ac(g, G)
N611   Σ_g←{label(e)|e∈E, q∈g, p(e)=q}
N612   if Σ_g=φ
N613     g_erase←merge_states_ac({g})
N614   else
N615     H←φ
N616     foreach σ∈Σ_g
N617       η←φ
N618       g_n←{q∈Q|e∈E, p(e)∈g, q=n(e), σ=label(e)}
N619       foreach g'∈G
N620         g_ni←g_n∩g'
N621         if|g_ni|>1
N622           G←search_equiv_ac(g_ni, G)
N623       g_n←{q∈Q|e∈E, p(e)∈g, q=n(e), σ=label(e)}
N624       foreach q_n∈g_n
N625         g_s←{q∈g|e∈E, q=p(e), q_n=n(e), σ=label(e)}
N626         if|g_s|>1
N627           η←η∪{g_s}
N628       H←H∪{η}
N629     G_share←∪_{g_s∈η} search_sharable_state(g_s, H\{η}), where η∈H
N630     g_erase←merge_states_ac(G_share)
N631     G'← ∪_{g'∈G, g'≠g} {g_r|g_r=g'\g_erase, |g_r|>1}
N632   return G'
```

```
        merge_states_ac(G_share)
N641    Q_e ← ∅
N642    foreach g_s ∈ G_share
N643      let r:r ∈ g_s
N644      foreach q_e ∈ (g_s \ {r})
N645        merge(r, q_e)
N646        Q_e ← Q_e ∪ {q_e}
N647    return Q_e
```

INFORMATION PROCESSING APPARATUS, INFORMATION PROCESSING METHOD, AND COMPUTER PROGRAM PRODUCT FOR REDUCING STATES IN A DETERMINISTIC FINITE STATE AUTOMATON

CROSS-REFERENCE TO RELATED APPLICATIONS

This application is based upon and claims the benefit of priority from the prior Japanese Patent Application No. 2008-249029, filed on Sep. 26, 2008; the entire contents of which are incorporated herein by reference.

BACKGROUND OF THE INVENTION

1. Field of the Invention

The present invention relates to an information processing apparatus, an information processing method, and a computer program product for reduction in the number of states in a deterministic finite state automaton.

2. Description of the Related Art

A finite state automaton (FSA), which represents combinations of a finite number of states, transitions, and actions, is called a finite automaton or a finite state machine (FSM) and used in various fields. One type of the finite state automaton, in which when an input symbol is provided, a transition destination state is uniquely determined, is called a deterministic finite state automaton (DFA). The DFAs includes one in which there are outgoing transitions from each state for all input symbols, and also includes one in which there are outgoing transitions for only some input symbols.

As an example that uses the DFA in a field of speech recognition, a dictionary that records therein phoneme sequences of recognizable words is represented by the DFA. In this example, when the number of states represented by the DFA is reduced, processing efficiency can be enhanced. Another example of the application is text search, in which the DFA can be used as follows. When a text is to be searched for plural keywords, the DFA is created based on the plural keywords and, upon reaching a final state, it is notified that any one of the plural keywords is found. Also when such processing is performed, the processing efficiency can be enhanced by reducing the number of states in the DFA.

It has been known that when a DFA is provided, the DFA has one with a minimal number of states. Various methods for obtaining the DFA with a minimal number of states are proposed. As conventional methods, a method of Hopcroft and Ullman (see Introduction to Automata Theory, Languages, and Computation, Second Edition, Chap. 4, Sec. 4 "Equivalence and Minimization of Automata", John E. Hopcroft, Rajeev Motwanai, Jeffrey D. Ullman, 2000), a method of Aho et al. (see Alfred V. Aho, Ravi Sethi, Jeffrey D. Ullman, Compilers Principles, Techniques, and Tools, 1985, pp. 142-143), and a method of Hopcroft (see J. E. Hopcroft, An n log n algorithm for minimizing the states in a finite automaton, Theory of Machines and Computations, Academic Press, New York, 1971, pp. 189-196) are known.

However, in the above methods, when processing related to minimization of the number of states is interrupted, an intermediate result cannot be obtained. That is, reduction in the number of states in a large-scale DFA that requires much time for the minimization process cannot be achieved incrementally. As methods for solving the problem, methods disclosed in "An incremental DFA minimization algorithm, by Bruce W. Watson, Workshop on Finite State Method in Natural Language Processing (FSMNLP '01), 2001", and "An efficient incremental DFA minimization algorithm, by Bruce W. Watson and Jan Daciuk, Natural Language Engineering, 9(1), 2003, pp. 49 to 64" (hereinafter, "methods of Watson et al.") are conventionally known. By using these methods, when processing related to reduction in the number of states is interrupted, a DFA at the interruption can be obtained, and when the processing is completed, a DFA with a minimized number of states can be obtained.

The reason why the methods of Watson et al. enable to interrupt the processing is that distinguishability between two states is incrementally checked for all pairs one by one. For example, an entire string of input symbols leading a certain state p to a final state is defined as a language L(p). A fact that two states p and q are distinguishable means $L(p) \neq L(q)$. Similarly, a fact that the two states p and q are indistinguishable means $L(p)=L(q)$. When it is recognized that the two states are indistinguishable, one of the two states can be regarded as the same as the other and be deleted at that time. Therefore, even when the processing is interrupted, a DFA in which some states are determined indistinguishable and the number of states is reduced by the previous processing can be obtained.

However, among the methods of Watson et al., in the method described in "An incremental DFA minimization algorithm, Workshop on Finite State Method in Natural Language Processing (FSMNLP '01), 2001", the process of checking distinguishability between two states for all pairs and merging indistinguishable states into one is performed. Therefore, when the number of states increases, the amount of processing is increased rapidly. In the method described in "An efficient incremental DFA minimization algorithm, Natural Language Engineering, 9(1), 2003, pp. 49 to 64", 2-tuples of states determined distinguishable need to be stored to shorten the processing time. Therefore, a memory area proportional to the square of the number of states is needed at a maximum, and accordingly a large memory area is required when the number of states is large.

SUMMARY OF THE INVENTION

According to one aspect of the present invention, an information processing apparatus includes a state classifying unit that classifies first states included in a deterministic finite automaton into state sets, the state sets having same input symbols associated with outgoing transitions and same finality indicating whether a state in the first states is a final state; a calculating unit that calculate, for each of the state sets, an intersection set between each of the state sets and a set of transition destination states which is obtained by translating each of states included in the state sets; a repeating unit that repeats a calculation of the intersection set, until the number of states included in the intersection set becomes equal to one, while regarding the set of the transition destination states for each of the input symbol included in the intersection set as new state sets; and a state merging unit that merges plural indistinguishable states into one state by tracing a route in a reverse direction to a transition direction, when the number of states has become equal to one.

According to another aspect of the present invention, an information processing method includes classifying first states included in a deterministic finite automaton into state sets, the state sets having same input symbols associated with outgoing transitions and same finality indicating whether a state in the first states is a final state; calculating, for each of the state sets, an intersection set between each of the state sets and a set of transition destination states which is obtained by translating each of states included in the state set; repeating a calculation of the intersection set, until the number of states included in the intersection set becomes equal to one, while regarding the set of the transition destination states for each of the input symbol included in the intersection set as new state sets; and merging plural indistinguishable states into one state by tracing a route in a reverse direction to a transition direction, when the number of states has become equal to one.

A computer program product according to still another aspect of the present invention causes a computer to perform the method according to the present invention.

BRIEF DESCRIPTION OF THE DRAWINGS

FIG. 4 is a diagram illustrating an example of a pseudocode of the state-number reducing process shown in FIG. 3;

FIG. 5 is a diagram illustrating an example of a pseudocode of a subprogram "create_class" shown in FIG. 4;

FIG. 6A is a diagram illustrating an example of a pseudocode of a subprogram "search_equiv" shown in FIG. 4;

FIG. 6B is a diagram illustrating another example of a pseudocode of the subprogram "search_equiv" shown in FIG. 4;

FIG. 7 is a diagram illustrating an example of a pseudocode of a subprogram "next_gamma" shown in FIG. 6A;

FIG. 8 is a diagram illustrating an example of a pseudocode of a subprogram "search_sharable_state" shown in FIG. 6B;

FIG. 9 is a diagram illustrating an example of a pseudocode of a subprogram "merge_states" shown in FIGS. 6A and 6B;

FIG. 10 is a diagram illustrating an example of a pseudocode of a subprogram "search_sharable_state_candidate" shown in FIG. 6B;

FIG. 27 is a diagram illustrating an example of a pseudocode of a subprogram "search_equiv2";

FIG. 36 is a diagram illustrating an example of a pseudocode of a subprogram "search_equiv_ac" shown in FIG. 35;

DETAILED DESCRIPTION OF THE INVENTION

Figure 1:
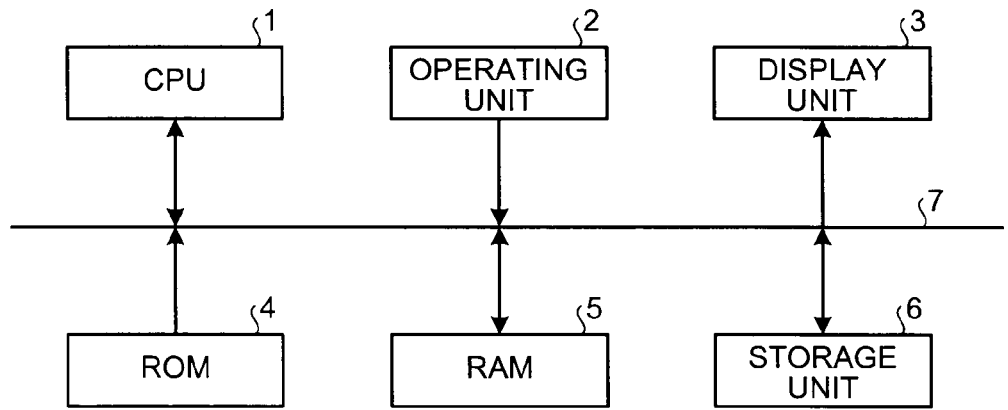
FIG. 1 is a block diagram of an example of a hardware configuration of an information processing apparatus according to a first embodiment of the present invention.

Exemplary embodiments of an information processing apparatus according to the present invention will be explained below in detail with reference to the accompanying drawings.

Symbols and terms used in the embodiments described below are explained first. A DFA is a 5-tuple and is represented as DFA=(Q, $\Sigma$, E, $q_0$, F), where Q is a set of states, $\Sigma$ is a set of input symbols, E is a set of transitions, and $q_0$ is an initial state. F is a set of final states and fulfills $F \subset Q$. With respect to a transition $e \in E$, p(e) represents a state of a transition source (hereinafter, "transition source state"), n(e) represents a state of a transition destination (hereinafter, "transition destination state"), and label(e) represents an input symbol assigned to the transition.

When all assigned to transitions are regarded as input symbols, techniques according to the embodiments described below can be also applied to cases that models derived from finite state automata such as a finite state transducer with input symbols and output symbols, and a weighted finite state automaton with weight are used.

When a set is represented by a program or the like, any representation can be applied as long as the set can contain elements and redundant elements are not included in the set.

For example, an array, a link list, a binary tree, or a hash table can be used. An empty set is denoted by $\phi$ or $\{\ \}$. The size of a set X is denoted by $|X|$. For example, the number of states included in a state set Q is denoted by $|Q|$.

A Kleene closure of the set $\Sigma$ of input symbols is denoted by $\Sigma^*$. That is, $\Sigma^*$ is a set including all input symbol strings that are composed of the input symbols included in the set $\Sigma$, and an empty input symbol string (also called empty character string or empty string).

A transition destination state obtained when an input symbol $\sigma \in \Sigma$ is input to a certain state q is represented as $\delta(q,\sigma)$. Similarly, a transition destination state obtained when an input symbol $w \in \Sigma^*$ is input to the state q is represented as $\delta(q,w)$. The same notation is used for a set of states. A set of transition destination states obtained when the input symbol $\sigma \in \Sigma$ is input to a state set s is represented as $\delta(s,\sigma)$. A set of transition destination states obtained when the input symbol $w \in \Sigma^*$ is input to the set s is represented as $\delta(s,w)$.

A set of input symbols assigned to outgoing transitions from a state $q \in Q$ is represented as $\Sigma_q$. Similarly, a set of input symbols assigned to outgoing transitions from the state set s is represented as $\Sigma_s$.

When a table for associating a value or set with a path index or state x as described later is denoted by D, D[x] indicates obtaining of the value or set associated in the table D. For example, D[x]←r indicates a process of associating a value r with x in the table D. When D[x]=y, an element in the table D corresponding thereto is represented as (x,y). When a pseudocode for processing all elements in the table D is to be described, the pseudocode is represented as foreach (x,y)∈D by using foreach statement.

It is assumed that variables in each pseudocode explained later are local variables unless otherwise specified. That is, the variables are effective only when the processing is performed within the range of the pseudocode. When a recursive call is performed, the variables are created for each call and data of the variables are not shared between different calls. Variables shared among all pseudocodes, that is, global variables are individually explained. The set Q of states, the set $\Sigma$ of input symbols, the set E of transitions, the initial state $q_0$, and the set F of final states included in the DFA are global variables.

With respect to the state q, when there is $w \in \Sigma^* \setminus \{\epsilon\}$ that fulfills $\delta(q,w)=q$, the state q is referred to as being on a cyclic path. A path to be tracked by w is called cyclic path. $w \in \Sigma^* \setminus \{\epsilon\}$ means a set including all input symbol strings except an empty input symbol string $\epsilon$.

It is assumed that $w_i$ is a symbol string composed of first to ith symbols in w. For example, when w=abc, $w_1$=a, $w_2$=ab, and $w_3$=abc. Assuming a state on a path following from a state $q \in Q$ by an input of the input symbol string $w \in \Sigma^* \setminus \{\epsilon\}$ is $Q_w$, it can be defined as $Q_w = \{q, \delta(q,w_1), \delta(q,w_2), \ldots, \delta(q,w)\}$. When a state $\delta(q,w\sigma)$ as a destination of a transition from a state $\delta(q,w)$ on an input symbol $\sigma \in \Sigma$ is included in $Q_w$, the state $\delta(q,w\sigma)$ is called a start state of the cyclic path. The start states of the cyclic path vary depending on which state is q. For example, states included in a set g selected at Step N103 in FIG. 3, which will be explained later, correspond to q.

When a language of an entire input symbol string leading a certain state p to a final state is defined as $L(q)=\{w \in \Sigma^* | \delta(q,w) \in F\}$, a fact that two states p and q are distinguishable means $L(p) \neq L(q)$. Similarly, a fact that the two states are indistinguishable means $L(p)=L(q)$. In an extended example in which the number of states is equal to or larger than three, a fact that states included in a state set s are indistinguishable from each other means $\delta(s,w) \subseteq F$ or $\delta(s,w) \subseteq Q \setminus F$ is true with respect to all input symbol strings $w \in \Sigma^*$. When a cyclic path is considered, there can be states that become indistinguishable when other states are indistinguishable. Such states are referred to as "indistinguishable candidates".

A dependence relation is information indicating a relationship between a dependence source state and a dependence destination state when the dependence source state is a state of an indistinguishable candidate and the dependence destination state is a state for determining whether the dependence source state becomes an indistinguishable state. Specifically, any one of start states of a cyclic path is a dependence destination state.

When a set of states is s, a fact that states included in the set s are distinguishable from each other means p and q are distinguishable with respect to all p∈s and q∈s, where p≠q. Similarly, a fact that the states included in the set s are indistinguishable from each other means p and q are indistinguishable.

State finality indicates whether a state q∈Q is included in a set F of final states. The state finality is true when q∈F, and false when ¬(q∈F). Each of states classified to have the same finality and the same set of input symbols of outgoing transitions, in other words, each of states having the same finality and the same set is assumed as a set, and a set having those sets as elements is denoted by G. Therefore, the set G is a set of state sets. It is also assumed that a set η is a set having state sets as elements, and a set having the sets η as elements is a set H.

In the embodiments explained below, a stack (stack S) is used for determining a cyclic path. However, a method of implementation of the stack is not particularly specified. For example, a stack can be configured by an array or a link list. However, it is necessary that details of elements recorded in the stack and storage locations thereof in the stack can be checked.

As shown in FIG. 1, an information processing apparatus 100 includes a central processing unit (CPU) 1, an operating unit 2, a display unit 3, a read only memory (ROM) 4, a random access memory (RAM) 5, a storage unit 6, and the like, which are connected via a bus 7.

The CPU 1 performs various kinds of processing by using a predetermined area in the RAM 5 as a working area in cooperation with various control programs previously stored in the ROM 4 or the storage unit 6, to generally control operations of the components included in the information processing apparatus 100. The CPU 1 realizes functions of functional units, which are explained later, in cooperation with the predetermined programs previously stored in the ROM 4 or the storage unit 6.

The operating unit 2 is an input device such as a mouse or a keyboard. The operating unit 2 receives information operated and input by a user as an instruction signal and outputs the instruction signal to the CPU 1.

The display unit 3 is configured with a display device such as a liquid crystal display (LCD), and displays various types of information according to a display signal from the CPU 1.

The ROM 4 non-rewritably stores therein programs associated with control on the information processing apparatus 100, various types of setting information, and the like. The RAM 5 is a volatile storage medium such as a synchronous dynamic RAM (SDRAM), and functions as the working area of the CPU 1. Specifically, the RAM 5 serves as a buffer that temporarily stores therein variables or parameters generated in a state-number reducing process, which will be explained later.

The storage unit 6 has a storage medium capable of magnetic or optical recording, and rewritably stores therein programs associated with the control on the information processing apparatus 100, various types of setting information, and the like. The storage unit 6 previously stores therein various type of information such as programs for realizing functional units that perform the state-number reducing process, which is explained later, and a DFA as a target for the state-number reducing process.

Figure 2:
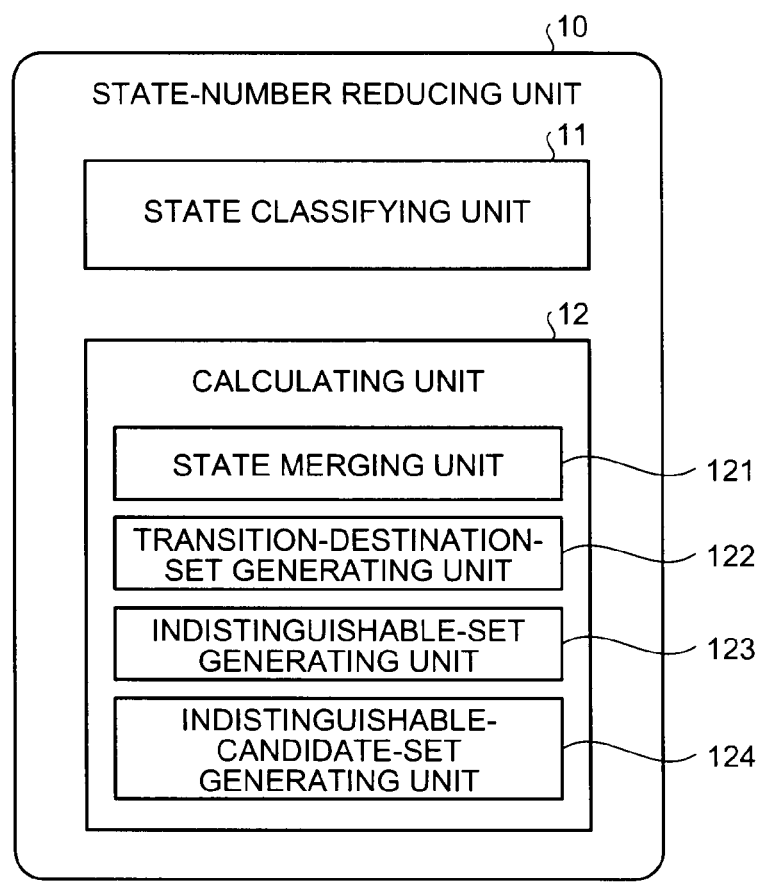
FIG. 2 is a block diagram of a functional configuration of the information processing apparatus shown in FIG. 1.

As shown in FIG. 2, the information processing apparatus 100 includes a state-number reducing unit 10 as a functional unit that is realized by the CPU 1 in cooperation with the predetermined program previously stored in the ROM 4 or the storage unit 6.

The state-number reducing unit 10 includes a state classifying unit 11 and a calculating unit 12, and performs the state-number reducing process, which is explained later, in cooperation with these functional units to incrementally reduce the number of states included in the DFA as the processing target.

The state classifying unit 11 classifies the states included in the DFA as the processing target into states each having the same finality and the same type of input symbols associated with outgoing transitions. Resultant classes can be expressed as sets of states. The entire classification is composed of classes and can be expressed as a set of classes, that is, a set having the state sets as elements. It is assumed below that a set of states classified by the state classifying unit 11 is denoted by g, and a set of all the classes having the sets g as elements is denoted by G. When the number of states included in a class is one, the state classifying unit 11 does not include the class in the set G. That is, $|g|>1$ is true with respect to all $g \in G$.

The state classifying unit 11 determines whether the set G is an empty set $\phi$. When determining that the set G is an empty set $\phi$, the state classifying unit 11 determines that the number of states included in the DFA as the processing target is minimal. When determining that the set G is not an empty set $\phi$, the state classifying unit 11 selects one of the sets g as the elements of the set G and transfers the selected set g to the calculating unit 12. The order in which the elements are selected does not matter and the elements can be selected in the order of ascending or descending sizes of g, for example.

The calculating unit 12 includes a state merging unit 121, a transition-destination-set generating unit 122, an indistinguishable-set generating unit 123, and an indistinguishable-candidate-set generating unit 124, as shown in FIG. 2. The calculating unit 12 merges indistinguishable states among the states included in the set g into one state in cooperation with these functional units, and removes the merged sets g from the set G. Details of an operation of the calculating unit 12 will be explained later.

A state-number reducing process performed by the state-number reducing unit 10 according to the first embodiment is explained below. Steps denoted by Step N110 (Steps N111 to N119) in FIG. 3 indicate details of processing performed by the calculating unit 12.

The state classifying unit 11 first classifies the states included in the DFA as the processing target according to finality of the states and types of input symbols associated with outgoing transitions (Step N101).

The state classifying unit 11 then determines whether the set G having the sets g classified at Step N101 as elements is an empty set $\phi$ (Step N102). When determining that the set G is not an empty set $\phi$ (NO at step N102), the state classifying unit 11 selects one of the sets g included in the set G and hands over the processing to the calculating unit 12 (Step N103).

The calculating unit 12 generates a set $\Sigma_g$ of input symbols associated with outgoing transitions for each of the states included in the set g selected at Step N103 (Step N111).

The calculating unit 12 then performs a loop process (Loop 1) from Step N112 to Step N115. At Step N112, the calculating unit 12 first determines whether processes at Steps N113 and N114 are completed for each of the input symbols included in the set $\Sigma_g$. The calculating unit 12 then selects one of the input symbols from the set $\Sigma_g$ and derives a set $g_n$ of transition destination states of the states that are included in the set g and transit on the selected input symbol (Step N113).

The calculating unit 12 then obtains an intersection set $(g_n \cap g')$ of the set $g_n$ and each element g' in the set G ($g' \in G$), and recursively performs the processes at Steps N111 to N119 by assuming the intersection set as the set g only when the size of the intersection set is equal to or larger than two ($|g_n \cap g'|>1$) (Step N114).

When the loop process from Step N112 to Step N115 is completed, distinguishable states among the transition destination states have been bundled together by the recursive processing. Assuming this, the calculating unit 12 merges indistinguishable states among the states included in the set g into one state, respectively (Step N116). When there is information on a dependence relation, which is explained later, generated during the recursive processing at Step N114 and there are further states to be merged, these states are merged into one state.

The calculating unit 12 then determines whether the set g is on a cyclic path. When the set g is on the cyclic path, the calculating unit 12 records therein information on a state set as a dependence destination of the set g (Step N117). Even when it is determined that the set g is on the cyclic path, when the set g cannot be determined indistinguishable at that time, the calculating unit 12 records therein information on a dependence relation of the set g as a dependence source and a start state of the cyclic path as a dependence destination. In this case, when the state set of the dependence destination is determined indistinguishable, the states are merged into one. According to the above definitions, the start state of the cyclic path means a state to be processed first among the states on the cyclic path.

When none of the states included in the set g is on the cyclic path, the calculating unit 12 removes elements in the set G corresponding to the set g, from the set G (Step N118). The calculating unit 12 removes states that are determined indistinguishable and removed in the process of merging the states into one state, from the set G (Step N119) and returns to the process at Step N102.

When determining that the set G is an empty set at Step N102 (YES at Step N102), the state classifying unit 11 determines that the DFA as the processing target has a minimized number of states and ends the processing.

Each time the process at Step N110 is performed, indistinguishable states are merged, thereby reducing the number of states. Accordingly, even when the processing is interrupted before completion of the processing, the DFA at the intermediate time can be obtained. This processing includes the recursive process; however, the recursive process can be of course changed to a repetitive process by a common method of recording local variables, that is, variables generated in the process at Step N110 at each call of this process, into the stack.

A specific example of a method of realizing the state-number reducing process is explained below. FIG. 4 is a diagram illustrating an example of a pseudocode of a main program "simin" for the state-number reducing process. In this example, "A" in parenthesis is an argument, which is the DFA as the processing target.

The state-number reducing unit 10 first empties a stack S that stores therein a set of 2-tuples of state and path index, and brings a table D that stores therein dependence relations of the states into an empty set (Step N201). It is assumed that the stack S and the table D are global variables. That is, the same stack S and the same table D can be referred to from each pseudocode explained later.

The state-number reducing unit 10 then classifies the states included in the DFA as the processing target according to the finality and the input symbols of outgoing transitions, by means of the state classifying unit 11, and assigns a result to the set G (Step N202). Specifically, the state-number reducing unit 10 combines states having the same conditions for a set including input symbols associated with all outgoing transitions from a state and finality of the state into one set g, and assumes a set of the sets g as the set G. When there is a plurality of patterns of transition or finality, a plurality of the sets g is generated. The set g having one element is not included in the set G. Expressing as a matter of form, $\forall g \in G$ and $|g| > 1$. These processes are performed in a subprogram "create_class" described at Step N202. The subprogram "create_class" will be explained later.

Assuming arbitrary states $q_1, q_2 \in g$ with respect to all $g \in G$, contents of the set G obtained at Step N202 satisfy {label(e) |e∈E, p(e)=$q_1$} = {label(e)|e∈E, p(e)=$q_2$} and $q_1, q_2 \in F \vee \neg (q_1, q_2 \in F)$. The process at Step N202 corresponds to that at Step N101 shown in FIG. 3.

The subprogram "create_class" at Step N202 is explained with reference to FIG. 5.

The state classifying unit 11 first initializes the set G having the state sets g as elements to be an empty set φ, and initializes a table C that stores therein 2-tuples of state finality and the set $\Sigma_q$ associated with the corresponding state sets g to be an empty set φ (Step N211).

The state classifying unit 11 then performs processes at Steps N213 and N214 for each of states q in a state set Q included in the DFA as the processing target according to for each statement at Step N212. At Step N213, the state classifying unit 11 generates a set of input symbols of outgoing transitions from the state q, and assigns the generated set to the set $\Sigma_q$. At Step N214, the state classifying unit 11 registers the 2-tuples of finality of the state q and the set $\Sigma_q$ in the table C, and adds the states q corresponding to conditions of these 2-tuples to the set g associated with the conditions. At Step S214, "q∈F" indicates an operation that holds true when the state q is a final state and otherwise false.

Subsequent Step N215 indicates that the state classifying unit 11 performs processes at Step N216 and N217 for each of elements registered in the table C. The state classifying unit 11 applies only the state sets g associated with the 2-tuples of state finality and the set $\Sigma_q$ at Steps N216 and N217. At Step N216, the state classifying unit 11 determines whether the size of the set g is equal to or larger than two ($|g| > 1$). When the size is equal to or larger than two, the state classifying unit 11 adds the set g to the set G at Step S217.

When determining that the size of the set g is equal to or smaller than one ($|g| \leq 1$) at Step N216, the state classifying unit 11 performs the process at Step N215 for the next element registered in the table C. Upon completion of the processes at Steps N216 and N217 for all the elements, the state classifying unit 11 proceeds to a process at Step N218.

The state classifying unit 11 then returns the set G obtained in the above processes as a result of the processing of "create_class" to the main program "simin" (Step N218), and ends the processing of "create_class".

Returning to FIG. 4, the state-number reducing unit 10 repeatedly performs processes at Steps N204 and N205 until the set G becomes an empty set φ (Step N203). The process at Step N203 corresponds to that at Step N102 shown in FIG. 3.

At Step N204, the state-number reducing unit 10 selects an arbitrary element (set g) from the set G. The order in which the elements are selected does not matter and the elements can be selected in the order of ascending or descending sizes of g, for example.

At subsequent Step N205, the state-number reducing unit 10 merges indistinguishable states among the states included in the set g and transition destination states from the states into one state, by using the calculating unit 12. The processes at Steps N204 and N205 correspond to those at Steps N103 and N110 shown in FIG. 3, respectively.

In a subprogram "add_path_index" related to generation of an argument of the subprogram "search_equiv", a process of generating a set of elements of the set g having numbers beginning from 1 attached thereto is performed. This number is referred to as "path index", and a set of states assigned with the path indices is denoted by γ. It is assumed here that an element in the set γ is a 2-tuple (state, path index). It is only necessary to associate a unique number with each of the states included in the set g, and accordingly, when a practical program is to be implemented, an array or a link list having the states included in the set g as elements can be used. A subprogram "search_equiv" for performing the process at Step N205 will be explained later.

The process of merging the states is completed each time the processes at Steps N204 and N205 are performed. Accordingly, even when the processing is interrupted before the set G becomes an empty set φ, a DFA at the time of the interruption can be obtained. Further, the subprogram "search_equiv" explained later and subprograms called therefrom can be interrupted in the course of processing while there are some exceptions. It is understood that the incremental processing is performed in these regards. A point at which a DFA at the time of the interruption cannot be obtained when the processing is interrupted will be explained later.

The subprogram "search_equiv" at Step N205 is explained with reference to FIGS. 6A and 6B. FIGS. 6A and 6B are an example of a pseudocode of "search_equiv". The subprogram "search_equiv" corresponds to the processes at Step N110 (Steps N111 to N119) shown in FIG. 3.

The calculating unit 12 first assigns a set of states that are obtained by removing the respective path indices from the elements of the set γ provided as an argument to the set g (Step N221). When the set γ is configured by a storage method such as an array or a link list in which the elements have the order and further configured to enable a set operation regardless of the order, the process at Step N211 of removing the path indices is not required, and thus the set γ can be used as the set g as is.

The calculating unit 12 then creates a set $\Sigma_g$ of input symbols associated with transition outgoings from each of the states included in the set g (Step N222). The states include in the set g are all included in the same set $\Sigma_g$. Therefore, it is not necessary to check the input symbols of outgoing transitions with respect to all states included in the set g at Step N222, and handling of only one of the states included in the set g will suffice. The process at Step N222 corresponds to that at Step N111 shown in FIG. 3.

The calculating unit 12 then brings a set $\Psi_{sc}$ to be used in a later process to an empty set φ (Step N223) and then determines whether the set $\Sigma_g$ is an empty set φ (Step S224). When the set $\Sigma_g$ is an empty set φ, the calculating unit 12 performs a process at Step N225. The fact that the set $\Sigma_g$ is an empty set φ indicates that there is no transition destination, and thus the states included in the set g are indistinguishable. That is, these states can be merged into one state. Therefore, the calculating unit 12 executes a subprogram "merge_states" by using the state merging unit 121 to merge the states included in the set g into one state (Step N225). When there is a transition destination, $|\Sigma_g|>0$ is true, and thus the calculating unit 12 proceeds to Step N226 to perform processes at Steps N227 to N267. The subprogram "merge_states" is explained later.

At Step N227, the calculating unit 12 brings a set H to an empty set $\phi$ and brings a set $Y_{sc}$ to an empty set $\phi$. The calculating unit 12 then stores current values in the set $\gamma$ in the stack S (Step N228). The calculating unit 12 then performs processes at Steps N230 to N254 for each of elements $\sigma$ in the set $\Sigma_g$ according to foreach statement at Step N229. The processes at Steps N229 to S254 correspond to those at Steps N112 to N115 in FIG. 3.

At Step N230, the calculating unit 12 brings the set $\Psi_{sc}$, a set $\Psi_{nsc}$, and a set $\eta$ to be used in this loop to empty sets $\phi$ (Step N230). The calculating unit 12 then executes a subprogram "next_gamma" by using the transition-destination-set generating unit 122 to record a set of transition destination states from the states included in the set $\gamma$ on an input symbol $\sigma$ together with the corresponding path indices in a set $\gamma_n$ (Step N231). The subprogram "next_gamma" is explained later.

When $|\gamma|=|\gamma_n|$, the path indices need to be numbers corresponding to transition sources. When there are 2-tuples including the same states and different path indices, $|\gamma|>|\gamma_n|$. Therefore, any path indices can be assigned as long as the path indices included in the set $\gamma_n$ are different from each other. For example, to 2-tuples including the same states and different path indices, a smallest one of the path indices can be reassigned.

The reason why the path indices can be reassigned when $|\gamma|>|\gamma_n|$ is as follows. The path index is used to find a cyclic path. It is necessary that the stack S includes the set $\gamma_n$ to determine a cyclic path. If $|\gamma|>|\gamma_n|$ is true, $|\gamma_s|>|\gamma_n|$ is true for all $\gamma_s \in S$. This indicates that the set $\gamma_n$ is not included in the stack S when $|\gamma|>|\gamma_n|$. Therefore, the path indices of the set $\gamma_n$ can be defined regardless of the path indices of the set $\gamma$.

The calculating unit 12 determines whether the set $\gamma_n$ is stored in the stack S (Step N232). When the set $\gamma_n$ is not stored in the stack S, the calculating unit 12 performs processes at Steps N233 to N248.

When the set $\gamma_n$ is not stored in the stack S, the calculating unit 12 performs the processes at Step N234 to N237 for all state sets g' included in the set G according to foreach statement at Step N233. At Step N234, the calculating unit 12 selects only states included in the set g' from among elements of the set $\gamma_n$ and assigns the selected states to a set $\gamma_{ni}$. In other words, the calculating unit 12 obtains an intersection set of a state set including states that are recorded in 2-tuples (state, path index) included in the set $\gamma_n$ and the set g' while maintaining the path indices, to be a set $\gamma_{ni}$. In this pseudocode, the path indices are always maintained. However, when $|\gamma|>|\gamma_{ni}|$, the path indices need not to be maintained and thus can be reassigned.

Assuming that the sets $\gamma$, $\gamma_n$, and $\gamma_{ni}$ are arrays in which first indexes are fixed, the indices of the arrays are path indices, and elements of the arrays are states, the set $\gamma$ and the like can be represented without unnecessarily using the memory area. When the number of elements is reduced, the path indices can be reassigned. Therefore, it is only necessary to constantly prepare the array sizes corresponding to the sizes of the set $\gamma$, $\gamma_n$, and $\gamma_{ni}$.

In this pseudocode, the process at Step N234 is performed for all the elements included in the set G at Step N233. However, in many cases, when the operation of obtaining an intersection set of the set g' and the set $\gamma_n$ is performed, $\gamma_{ni}=\phi$. Accordingly, it is possible to perform the process at N234 only for some of the elements to achieve a more efficient operation as follows. This is realized by generating a table for determining which element in the set G includes each of the states when the set G is obtained by the subprogram "create_class". In this way, the processes at Steps N233 to N237 can be efficiently performed for only elements in the set G that include the states included in the set $\gamma_n$ among the elements of the set G. As a result, only the set $\gamma_{ni}$ having the size equal to or larger than one is generated.

At subsequent Step N235, the calculating unit 12 determines whether the size of the set $\gamma_{ni}$ is larger than one. When the size of the set $\gamma_{ni}$ is equal to or smaller than one, the calculating unit 12 returns to Step N233 again. When the size of the set $\gamma_{ni}$ is larger than one at Step N235, the calculating unit 12 recursively calls "search_equiv" at subsequent Step N236. As a result, the set G is updated. The set G has been used in the determining process at Step N233, and the elements that have processed up to that time need not to be processed again. When there are indistinguishable candidate states, which will be explained later, in the states in the set $\gamma_{ni}$, dependence relations thereof are recorded in a set $\Psi_{nsct}$. The calculating unit 12 adds elements of the set $\Psi_{nsct}$ to the set $\Psi_{nsc}$ (Step N237).

The calculating unit 12 then obtains a set $g_n$ of states as transition destinations of the set g associated with the input symbol $\sigma$ (Step N238). This is because the number $|Q|$ of states in the DFA as the processing target may be decreased due to the recursive call of the subprogram "search_equiv". However, a situation that $|\gamma_n|<|g_n|$ never occurs.

The calculating unit 12 performs processes at Steps N240 to N243 for all states included in the set $g_n$ to merge states having the same transition destinations into one state according to foreach statement at Step N239.

At Step N240, the calculating unit 12 assigns a set of states having the same transition destinations on the input symbol $\sigma$ among the states included in the set g, to a set $g_s$. There is a possibility that the states are not included in the set g due to the recursive call at Step N236. However, this causes no problem because such states do not appear in p(e).

The calculating unit 12 then determines whether the size of the set $g_s$ is larger than one (Step N241). When the size is equal to or smaller than one, the calculating unit 12 proceeds to a process at Step N244. When determining that the size of the set $g_s$ is larger than one at Step N241, it implies that the states included in the set $g_s$ transit to the same state on the input symbol $\sigma$, and thus the calculating unit 12 cannot distinguish the states included in the set $g_s$ with respect to the input symbol $\sigma$. Therefore, the calculating unit 12 adds the set $g_s$ to the set $\eta$ as an element to store therein a set of indistinguishable states for each input symbol (Step N242).

The calculating unit 12 further adds a set of 2-tuples (q,q) each having itself as a dependence destination state and a storage location of the set recorded in the stack S, that is, the size |S| of the stack S, to the set $\Psi_{sc}$ to record the set $g_s$ also as an indistinguishable candidate (Step N243). It is assumed that indices indicating the storage locations in the stack S start from 1.

The calculating unit 12 performs processes at Step N245 to N248 for each element in the set $\Psi_{nsc}$ according to foreach statement at Step N244. At this time, when the transition destination states of the set g are indistinguishable candidates, dependency information is recorded in a set $\psi_{nsc}$. Therefore, the calculating unit 12 assumes dependence destination states thereof as dependence destinations of the states included in the set g currently processed and assigns the dependency relations of the states as the indistinguishable candidate included in the set g to the set $\psi_{sc}$ (Step N245).

The calculating unit 12 then determines whether a storage location $x_{level}$ of the dependence destinations stored in the stack S is equal to |S| of the stack S currently referred to (Step N246). When they are not equal, the calculating unit 12 directly proceeds to a process at Step N248. $x_{level}$ indicates the storage location of the dependence destination states of $\psi_{sc}$ in the Stack S.

Meanwhile, when determining that they are equal at Step N246, the calculating unit 12 finds that cyclic paths including the transitions on the input symbol σ are indistinguishable with respect to the input symbol σ based on dependence source states in 2-tuples (dependence source state, dependence destination state) included in the set $\psi_{sc}$. Therefore, the calculating unit 12 adds the dependence source states included in the set $\psi_{sc}$ to the set η (Step N247) There is no case in which $x_{level}$>|S|.

At subsequent Step N248, the calculating unit 12 adds a 2-tuple of the set $\psi_{sc}$ and the storage location $x_{level}$ of the dependence destination states in the stack S as an indistinguishable candidate to the set $\Psi_{sc}$.

Processes at Steps N249 to N253 are performed when the set $\gamma_n$ is stored in the stack S, that is, a cyclic path is found at the determination at Step N232. At Step N250, the calculating unit 12 generates the set $\psi_{sc}$ of 2-tuples (dependence source state, dependence destination state) indicating dependence relations. The dependence source state indicates a state included in the set g, and the dependence destination state indicates a state that can be reached from the dependence source state on the input symbol σ.

At subsequent step N251, the calculating unit 12 adds a 2-tuple of the set $\psi_{sc}$ and a storage location (level(S,$\gamma_n$)) of a set of dependence destination states of the set $\psi_{sc}$ stored in the stack S, to the set $\Psi_{sc}$. The calculating unit 12 then determines whether $\gamma=\gamma_n$, that is, a self transition is performed (Step N252). When determining that the self transition is performed, the calculating unit 12 adds the set g to the set η because the states included in the set g are indistinguishable (Step N253). The location (level(S,$\gamma_n$)) can be obtained at the same time as the condition evaluation at Step N232.

As described above, it is assumed that the indices of the stack S start from 1. Therefore, when the set $\gamma_n$ is stored at the bottom of the stack S, level(S,$\gamma_n$)=1. With the above processes, which states among the states included in the set g are indistinguishable or which states are indistinguishable candidates is found with respect to the input symbol σ. Therefore, the calculating unit 12 adds the set $\Psi_{sc}$ and the set η obtained at Steps N230 to N253 to the set $Y_{sc}$ and the set H, respectively, at Step N254.

Figure 3:
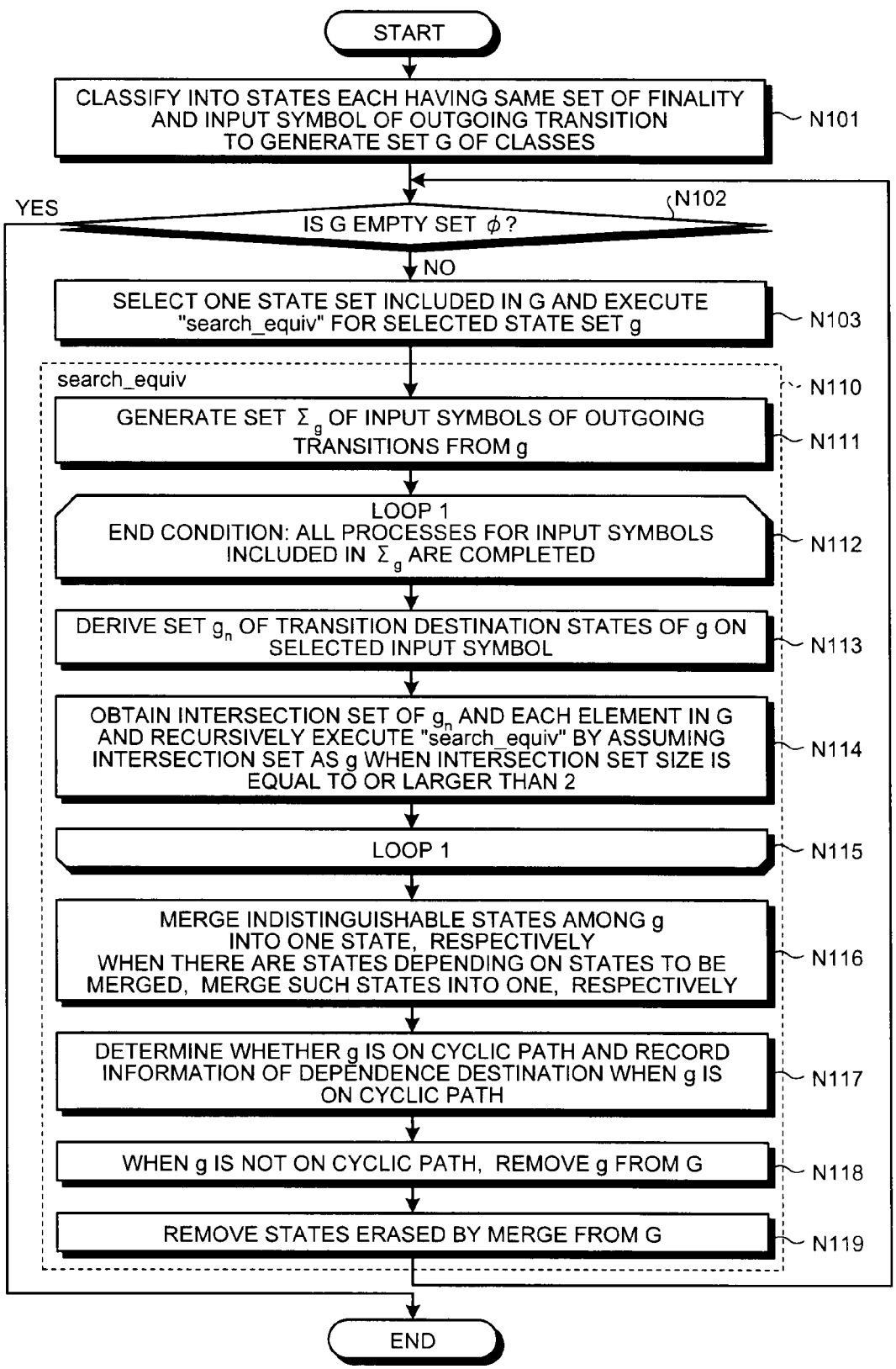
FIG. 3 is a flowchart of an outline of a state-number reducing process.

Subsequent Steps N255 and N256 correspond to Step N116 shown in FIG. 3. When the processing for all the input symbols included in the set $\Sigma_g$ is completed, processes from Step N255 are performed. In the processes from Step N255, indistinguishability of the states included in the set g is determined using the set η obtained for each input symbol up to Step N254, and indistinguishable states are merged into one state. States as indistinguishable candidates among the states in the set g are identified by using the set $\Psi_{sc}$ obtained for each input symbol up to Step N254.

At Step N255, the calculating unit 12 obtains a set having sets of indistinguishable states as elements. As the set η, any one of elements included in the set H can be selected. For example, an element having a smallest size in the set H can be selected.

Specifically, the calculating unit 12 executes a subprogram "search_sharable_state" for each of the state sets $g_s$ included in the set η using the indistinguishable-set generating unit 123, with the set $g_s$ as a first argument and a set (H\{η}) obtained by deleting the set η from the set H as a second argument. The calculating unit 12 obtains a union of return values by this execution as $G_{share}$. The subprogram "search_sharable_state" is explained later.

At Step N256, the calculating unit 12 executes a subprogram "merge_states" using the state merging unit 121 to merge the indistinguishable states detected at Step N255 into one state. At the same time, states depending on the indistinguishable states are also merged into one. The calculating unit 12 assigns states that have become unneeded and been erased because of the merge at Step N256 to a set $g_{erase}$. The subprogram "merge_states" is similar to the process at Step N225 and details thereof are explained later.

Processes at subsequent Steps N257 to N266 correspond to that at Step N117 shown in FIG. 3. At Step N257, the calculating unit 12 removes information related to the states erased due to the state merging process at Step N256 from the set $Y_{sc}$ in which dependency relations of the indistinguishable candidates included in the set g are recorded.

At subsequent Step N258, the calculating unit 12 executes a subprogram "search_sharable_state_candidate" for each of elements ($\psi$, $x_{level}$) of a set $\Psi$ by using the indistinguishable-candidate-set generating unit 124, thereby finding indistinguishable candidates. As the set $\Psi$, any one of elements included in the set $Y_{sc}$ can be selected. For example, an element having a smallest size among the elements in the set $Y_{sc}$ can be selected.

A first argument of the subprogram "search_sharable_state_candidate" is $\psi$, a second argument thereof is $x_{level}$, and a third argument thereof a set obtained by removing the set $\Psi$ from the set $Y_{sc}$. Because a result of "search_sharable_state_candidate" is returned as a return value at each execution, the calculating unit 12 assumes a union of the return values as $\Psi_{sc}$. The subprogram "search_sharable_state_candidate" is explained later.

The calculating unit 12 then removes elements having $x_{level}$ equal to or larger than |S| from the set $\Psi_{sc}$ (Step N259). The reason why these elements are removed from the set $\Psi_{sc}$ is that they never depend on themselves or states already processed.

The calculating unit 12 performs a process at Step N261 for each element ($\psi_{sc}$, $x_{level}$) in the set $\Psi_{sc}$ according to foreach statement at Step N260. At step N261, the calculating unit 12 records a dependence relation of the indistinguishable candidate in the table D as the global variable.

The calculating unit 12 then performs a process at Step N263 for each element ($\psi_{sc}$, $x_{level}$) in the set $\Psi_{sc}$ according to for each statement at Step N262. The calculating unit 12 performs processes at Steps N264 and N265 for each element d in D[|S|] according to foreach statement at Step N263.

At Step N264, the calculating unit 12 finds an element of d having $q_s$ as a dependence destination state for each element ($q_s$,$q_d$) included in $\psi_{sc}$, generates a set of 2-tuples (q',$q_d$) in which a dependence destination state of a dependence source state q'$_s$ corresponding to the element is changed to $q_d$, and obtains a union of all these sets as $d_p$. At subsequent step N265, the calculating unit 12 adds $d_p$ to D[$x_{level}$]. In the processes at Steps N262 to N265, reassignment of dependence destination states of states that are dependent on the indistinguishable candidates included in the set g is performed.

The calculating unit 12 then deletes the dependence relation corresponding to the storage location of |S| in the stack S (Step N266), and removes the set γ of states currently processed from the stack S (Step N267).

The calculating unit 12 then determines whether the set $\Psi_{sc}$ is an empty set φ (Step N268). When determining that the set $\Psi_{sc}$ is not an empty set $\phi$, the calculating unit 12 directly proceeds to a process at Step N270. When the set $\Psi_{sc}$ is an empty set $\phi$, the states included in the set g never become indistinguishable candidates. When there are indistinguishable states, these states have been already merged into one in the process at Step N256. When the states are distinguishable, these states need not to be checked again. Accordingly, the calculating unit 12 deletes elements corresponding to the set g among the elements of the set G, from the set G (Step N269). The processes at Steps N268 and N269 correspond to that at Step N118 shown in FIG. 3.

The states included in the set $g_{erase}$ are already erased and thus need not to be processed. Accordingly, the calculating unit 12 deletes the states included in the set $g_{erase}$ from the state sets as the elements of the set G to obtain a set G' at Step N270. It is assumed here that a state set as an element of the set G' having a size equal to or smaller than one is not included in the set G'. The process at Step N270 corresponds to that at Step N119 shown in FIG. 3.

The calculating unit 12 finally returns a 2-tuple including the updated set G' and the set $\Psi_{sc}$ in which the dependency relations of the indistinguishable candidates are recorded, as a return value to the main program "simin" (Step N271), and ends the processing of "search_equiv".

The subprogram "next_gamma" at Step N231 is explained with reference to FIG. 7.

The transition-destination-set generating unit 122 first initializes the set $\gamma$ in which 2-tuples $(q_n,i)$ of transition destination state and path index are recorded, to be an empty set $\phi$ (Step N281).

The transition-destination-set generating unit 122 then performs a process at Step N283 for each element in the set $\gamma$ according to foreach statement at Step N282. It is assumed here that the element in the set $\gamma$ as a processing target is expressed as $(q,i)$. With respect to a transition destination state $q_n$ of a transition of which the transition source state is q and the input symbol associated with the transition is $\sigma$, a 2-tuple $(q_n,i)$ is added to the set $\gamma_n$ when the state $q_n$ is not included in the set $\gamma_n$ (Step N283).

When the process at Step N283 is completed for all the elements in the set $\gamma$, the transition-destination-set generating unit 122 returns the resultant set $\gamma_n$ as a return value of the subprogram "next_gamma" to the calculating unit 12 (Step N284).

In the pseudocode explained with reference to FIG. 7, when there are 2-tuples having the same transition destination states and different path indices, a path index that has been processed first at Step N283 is left. However, When there are 2-tuples between which only path indices are different, $|\gamma|>|\gamma_n|$ is true and thus any path index can be assigned so long as the path index does not become the same as those of other 2-tuples included in the set $\gamma_n$.

The subprogram "search_sharable_state" at Step N255 is explained with reference to FIG. 8.

The indistinguishable-set generating unit 123 first determines whether the set H is an empty set $\phi$ (Step N291). When the set H is an empty set $\phi$, it implies that the intersection set operation is completed with respect to all input symbols, and thus the indistinguishable-set generating unit 123 proceeds to a process at Step N292. When the set H is not an empty set $\phi$, the indistinguishable-set generating unit 123 proceeds to a process at Step N293.

States included in a set $g_{start}$ provided as an argument by the calculating unit 12 are confirmed as indistinguishable at Step N292. Accordingly, to add the set $g_{start}$ to a set $G_s$, the indistinguishable-set generating unit 123 returns as a return value, a set having only the set $g_{start}$ as an element (step N292) and ends "search_sharable_state".

Meanwhile, at Step N293, the indistinguishable-set generating unit 123 selects one set having the state sets as elements from the set H, as the set $\eta$. A set corresponding to any input symbol can be selected as long as the set is included in the set H provided as the argument. For example, an element having a smallest size in the set H can be selected.

The indistinguishable-set generating unit 123 then initializes the set $G_s$ to be used for recording therein a set of indistinguishable states, to be an empty set $\phi$ (Step N294) and repeatedly performs processes at Steps N296 to N298 with respect to all the state sets g' included in the set $\eta$ according to foreach statement at Step N295.

At Step N296, the indistinguishable-set generating unit 123 obtains an intersection set $g_{is}$ of the state set $g_{start}$ provided as the argument and the set g'. The indistinguishable-set generating unit 123 then determines the size of the set $g_{is}$ is equal to or larger than two (Step N297). When the size of the set $g_{is}$ is equal to or larger than two, the indistinguishable-set generating unit 123 performs a process at Step N298. When the size of the set $g_{is}$ is equal to or smaller than one, it implies that the set $g_{is}$ includes no indistinguishable state and thus does not contribute to the process at Step N298. Therefore, the indistinguishable-set generating unit 123 directly proceeds to a process at Step N299.

At Step N298, the indistinguishable-set generating unit 123 recursively executes "search_sharable_state" using the set $g_{is}$ obtained in the intersection set operation and H\{$\eta$} obtained by deleting the set $\eta$ currently processed from the set H as arguments, and adds a set of indistinguishable states obtained from the recursive call to the set $G_s$.

Upon completion of the processing for all the sets g', the indistinguishable-set generating unit 123 returns the resultant set $G_s$ as a return value (Step N299) and ends "search_sharable_state".

As described above, at Step N255, the calculating unit 12 executes "search_sharable_state" for all state sets included in the set $\eta$ selected from the set H, and obtains a union of the results (return values) as the set $G_{share}$ having the indistinguishable state sets as the elements.

The subprogram "merge_states" at Steps N225 and N256 is explained with reference to FIG. 9.

To merge indistinguishable states into one, one of the indistinguishable states is selected as a representative state, and incoming transitions are caused to transit to the representative state. Outgoing transitions from the states other than the representative state are then deleted. In other words, when it is assumed that two states are indistinguishable, and a representative state, that is, a state to be left after merge is denoted by r, other states, that is, states to be erased are denoted by $q_e$, and a set of a transition (transition source state, transition destination source, input symbol) is denoted by E, the following operation can be performed for an incoming transition.

$$E \leftarrow \{(q_s,r,\sigma) \in E | (q_s,q_d,\sigma) \in E, q_d = q_e\} \cup \{(q_s,q_d,\sigma) \in E | q_d \neq q_e\}$$

For an outgoing transition, it suffices that an operation such as $E \leftarrow \{(q_s,q_d,a) \in E | g_s \neq q_e\}$ is performed.

The states $q_e$ are erased from the state set Q at the end. A subprogram for performing these processes is specified as "merge". It is also possible to collectively erase the states $q_e$ from the set Q after completion of the main program "simin", instead of erasing $q_e$ from the set Q by "merge $(r,q_e)$".

When the processing is interrupted during execution of the subprogram "merge", it becomes impossible to obtain the DFA having the states reduced by the previous processes. The indistinguishable candidate states depending on the states to be merged also need to be merged. For this purpose, the dependency information having an equivalent structure as that of the set having sets of 2-tuples of dependence source state and dependence destination state as the elements can be utilized.

To sum up, algorithm for merging indistinguishable states and indistinguishable candidate states depending on the indistinguishable states, that is, the subprogram "merge_states" is configured as shown in FIG. 9. While the explanations with reference to FIG. 9 will be given based on "merge_states" at Step N256, the same process is performed in "merge_states" at Step N225 aside from differences in the arguments.

The state merging unit 121 first brings a set $Q_e$ to an empty set $\phi$ (Step N301). The state merging unit 121 then repeatedly performs processes at Steps N303 to N313 for each element $g_s$ in the set $G_{share}$ according to foreach statement at Step N302.

At Step N303, the state merging unit 121 selects any one of states in the set $g_s$ as a representative state r. The representative state r can be any state. For example, a state having a smallest state index can be selected as the representative state r.

The state merging unit 121 then performs processes at Steps N305 and N306 for each state q, in a set $(g_s\backslash\{r\})$ obtained by deleting the state r from the state set $g_s$ according to foreach statement at Step N304. At Step N305, the state merging unit 121 merges states included in the set $q_e$ into the representative state r. At subsequent Step N306, the state merging unit 121 adds states that have become unnecessary due to the merge at Step N305 to the set $Q_e$.

The state merging unit 121 then repeatedly performs processes at Steps N308 to N313 for each element $\psi$ in $D_{elm}$ corresponding to D[|S|] according to foreach statement at Step N307.

At Step N308, the state merging unit 121 combines dependence source states of which the dependence destination states are included in the set $g_s$, and adds the combined states to the set g. The state merging unit 121 then determines whether the size |g| of the set g is equal to or larger than two (Step N309). When the size of the set g is equal to or larger than two, the states can be merged. Accordingly, the state merging unit 121 selects any one of the states in the set g as a representative state r' (Step N310). The representative state r' can be any state, and a state having a smallest state index can be selected, for example.

The state merging unit 121 then performs processes at Steps N312 and N313 for each state $q_e$ in a set $(g\backslash\{r'\})$ obtained by deleting the state r' from the set g according to foreach statement at Step N311. At Step N312, the state merging unit 121 merges the states $q_e$ into the representative state r'. At subsequent Step N313, the state merging unit 121 adds states that have become unnecessary due to the merge at Step N312 to the set $Q_e$.

The state merging unit 121 then returns the set $Q_e$ obtained in the previous processes, that is, a set of the unnecessary states as a return value to the calculating unit 12, and returns to the processing of "search_equiv" again. When the processing is interrupted during the processes at Steps N304 to N313, the DFA having the states reduced by the previous processes cannot be obtained. Accordingly, the configuration can be adapted to enable a control to prevent interruption of the processing during the processes at Steps N304 to N313, like in a fifth embodiment of the present invention explained later.

The subprogram "search_sharable_state_candidate" at Step N258 is explained with reference to FIG. 10.

In FIG. 10, an element $\psi$ and an element $\psi_{start}$ correspond to a set of 2-tuples (dependence source state, dependence destination state), and a set $\Psi$ corresponds to a set of 2-tuples ($\psi$, location of a dependence destination state in the stack S). A set Y is a set having the sets $\Psi$ as elements, and each of the elements corresponds to a result on each input symbol. Further, $x_{start}$ denotes a storage location of the dependence destination state of $\psi_{start}$ in the stack S.

The indistinguishable-candidate-set generating unit 124 first determines whether the set Y is an empty set $\phi$ (Step N321). When the set Y is an empty set $\phi$, the indistinguishable-candidate-set generating unit 124 performs a process at Step N322. The fact that the set Y is an empty set $\phi$ indicates that there is no element to be processed in the set Y, and thus states included in the element $\psi_{start}$ become indistinguishable candidates for all the input symbols included in the set $\Sigma_g$. Therefore, the indistinguishable-candidate-set generating unit 124 returns 2-tuples ($\psi_{start}$, $x_{start}$) of the indistinguishable candidates as return values to add the 2-tuples to a set $\Psi_s$ as a processing result of the pseudocode (Step N322).

At subsequent Step N323, the indistinguishable-candidate-set generating unit 124 selects an arbitrary element from the set Y as a set $\Psi$. Any element can be selected, and an element having a smallest size can be selected, for example.

The indistinguishable-candidate-set generating unit 124 then brings the set $\Psi_s$ to an empty set $\phi$ to store therein the indistinguishable candidates as the processing result (Step N324). The indistinguishable-candidate-set generating unit 124 then performs processes at Steps N326 to N332 for each element ($\psi$, $x_{level}$) in the set $\Psi$ according to foreach statement at Step N325.

At Step N326, the indistinguishable-candidate-set generating unit 124 compares $x_{start}$ and $x_{level}$ in size to determine whether the dependence destination state is included in the element $\psi$ or in the element $\psi_{starts}$. When there is a plurality of dependence destinations, a state near the bottom of the stack S, that is, a state near the start state of the cyclic path always has a priority. This indicates that a state having a smaller location value in the stack S has a priority. Accordingly, the indistinguishable-candidate-set generating unit 124 adopts a dependence destination state included in the element $\psi_{start}$ when $x_{start} < x_{level}$ (Step N327). When $x_{start} \geq x_{level}$, the indistinguishable-candidate-set generating unit 124 proceeds to Step N328 to provide a priority to a dependence destination state included in the element $\psi$ (Step N329). When $x_{start} = x_{level}$, the state $q_d$ in the element $\psi$ and the state $q_d$ in the element $\psi_{start}$ are the same, and accordingly, either process can be performed in such a case. It is assumed here that this case is processed at Step N329.

The indistinguishable candidates need to be included in both of the element $\psi_{start}$ and the element $\psi$, and thus an intersection set is obtained for the dependence source state at Steps N327 and N329. As a result, an element $\psi_{is}$ includes a 2-tuple of states of which the dependence source state as an indistinguishable candidate is included in both of the element $\psi_{start}$ and the element $\psi$, and the dependence destination is nearer to the bottom of the stack S. When the size of the element $\psi_{is}$ is equal to or smaller than one, the element never becomes an indistinguishable candidate, and thus the indistinguishable-candidate-set generating unit 124 performs subsequent processes only when the size of the element $\psi_{is}$ is equal to or larger than two (Step N330).

At Step N331, the indistinguishable-candidate-set generating unit 124 obtains a storage location of a dependence destination state included in $x_{is}$, which will be explained below, in the stack S. As the dependence destination state, a state having a smaller storage location in the stack S is selected. Therefore, one of $x_{start}$ and $x_{level}$ having a smaller value is selected. This value is denoted by $x_{is}$.

The indistinguishable-candidate-set generating unit 124 recursively executes the subprogram "search_sharable_state_candidate" using the element $\psi_{is}$ processed at Step N331 as a first argument, $x_{is}$ as a second argument, and a set (Y\{Ψ}) obtained by deleting the set Ψ selected at Step N323 from the set Y as a third argument, and adds an obtained result to the set $\Psi_s$ (Step N332). The indistinguishable-candidate-set generating unit 124 returns the set $\Psi_s$ obtained as a result of the previous processes as a return value (Step N333) and ends the processing of "search_sharable_state_candidate".

In "search_sharable_state_candidate", the indistinguishable states are not handled explicitly; however, these states can be processed by including the states into ψ as indistinguishable candidates of which the dependence destinations are themselves. By doing so, it is possible to find indistinguishable candidates without handing the indistinguishable states as distinguishable states. Such processing is seen at Step N243 in "search_equiv", for example. Whether the states are indistinguishable can be found in "search_sharable_state". Accordingly, when both of the subprograms are used, three types of states, that is, distinguishable, indistinguishable, and indistinguishable candidates, can be handles.

An operation of the state-number reducing unit 10 is explained with reference to a specific example.

Figure 11:
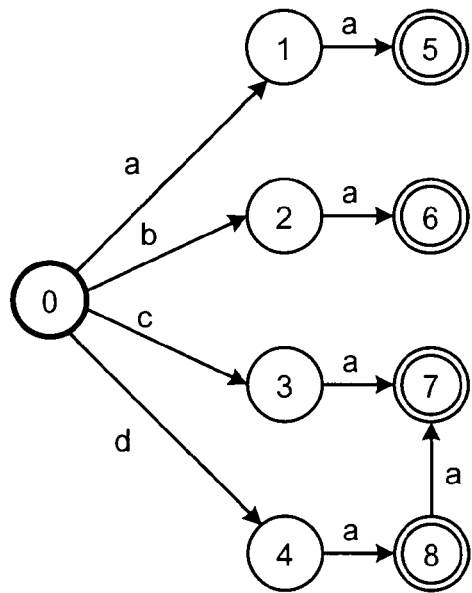
FIG. 11 is a diagram illustrating an example of the DFA.

An operation of the state-number reducing unit 10 for a DFA having no cyclic path as a processing target as shown in FIG. 11 is first explained. FIG. 11 is a diagram illustrating an example of the DFA, in which each circle represents a state and a number in the circle represents a state index for identifying the state. A circle in a thick line among the circles represents an initial state, and circles in double lines represent final states. In FIG. 11, an arrow represents a transition, and a symbol attached to each arrow represents an input symbol.

The state-number reducing unit 10 executes the main program "simin" for the DFA as a processing target as shown in FIG. 11. Details of relevant processes in each program are explained below.

The state-number reducing unit 10 first initializes the stack S and the table D to be empty sets ϕ (Step N201 in FIG. 4). The state-number reducing unit 10 then executes the subprogram "create_class" by using the state classifying unit 11, to classify the states included in the DFA as the processing target into states having the same state finality and the same set of input symbols of outgoing transitions (Step N202). As a result, it is found that the states are classified into a state 0, states 1, 2, 3, 4, states 5, 6, 7, and a state 8. Classes including one state are unnecessary here and thus G={{1, 2, 3, 4}, {5, 6, 7}}.

Figure 12:
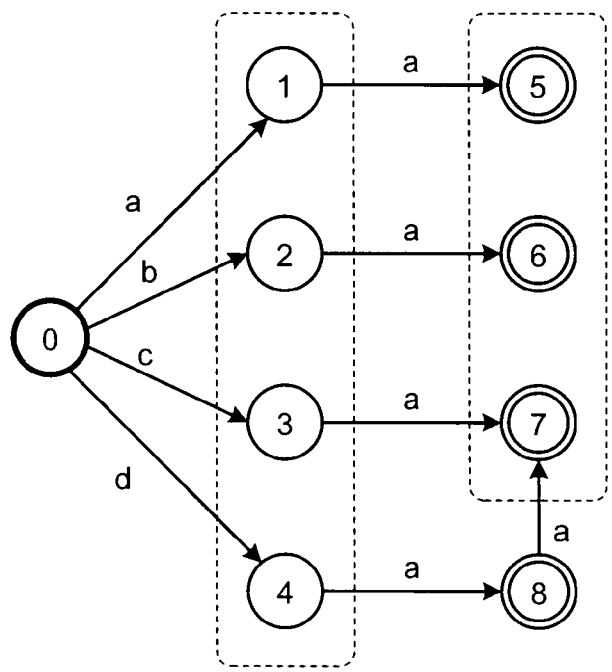
FIG. 12 is a diagram illustrating a configuration of the DFA shown in FIG. 11 after state classification.

FIG. 12 depicts a configuration of the DFA as show in FIG. 11 after the state classification. Each group enclosed in a dotted line corresponds to a class, and it is found that the states 1, 2, 3, and 4 fall into one class and the states 5, 6, and 7 fall into another class.

In this example, the set G is not an empty set ϕ, and thus the state-number reducing unit 10 determines that the condition at Step N203 is met and selects an arbitrary element in the set G (Step N204). It is assumed here that the state-number reducing unit 10 selects g={1, 2, 3, 4}.

The state-number reducing unit 10 then executes the subprogram "add_path_index" to assign a path index to each element in the set g, and uses an obtained result γ={(1, 1), (2, 2), (3, 3), (4, 4)} as a first argument of the subprogram "search_equiv". As described above, a 2-tuple as an element of the set γ is composed of (state, path index). Therefore, (1, 1) indicates that the name of the state (state index) is 1 and the path index is 1.

The calculating unit 12 starts executing the subprogram "search_equiv" according to an instruction from the state-number reducing unit 10. At Step N221 in FIG. 6A, the calculating unit 12 first extracts only the state indices from the set γ, and g={1, 2, 3, 4} is obtained as a result. At subsequent Step N222, $\Sigma_g$={a} is obtained.

The calculating unit 12 then brings the set $\Psi_{sc}$ to an empty set ϕ (Step N223). Because the set $\Sigma_g$ at that time is not ϕ ($\Sigma_g \neq \phi$), the calculating unit 12 brings the sets H and $Y_{sc}$ to empty sets ϕ at Step N227 and stores the set γ in the stack S at Step N228.

Figure 13:
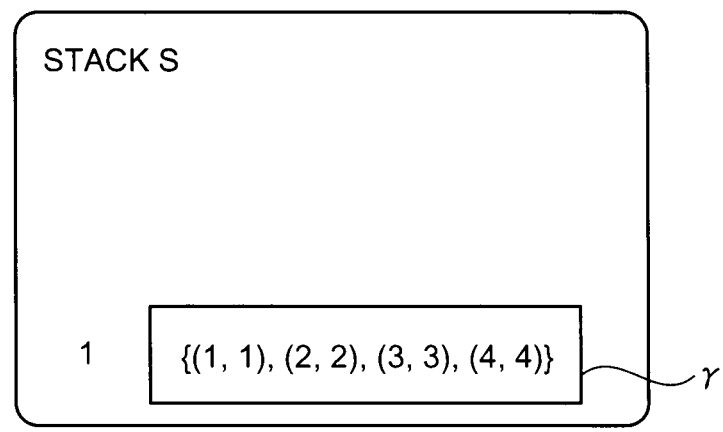
FIG. 13 is a diagram schematically illustrating a status of a stack S.

FIG. 13 schematically depicts the stack S, showing a status immediately after Step N228. As shown in FIG. 13, γ={(1, 1), (2, 2), (3, 3), (4, 4)} is stored in the stack S. The number shown on the left of the set γ indicates a storage location of the set γ counting from the bottom of the stack S.

The calculating unit 12 then performs the processes at Steps N230 to N254 for each of values σ according to foreach statement at Step N229. Because $\Sigma_g$={a} here, the calculating unit 12 performs the processes only once for σ=a (Step N229).

When the calculating unit 12 executes "next_gamma" at Step N231 by using the transition-destination-set generating unit 122, $\gamma_n$={(5, 1), (6, 2), (7, 3), (8, 4)} is obtained as a result. Specifically, because the transition destination of the state 1 is the state 5 and the path index of the state 1 is 1, the path index of the state 5 becomes 1. The same can be said for other elements.

At this time, as shown in FIG. 13, only γ={(1, 1), (2, 2), (3, 3), (4, 4)} is recorded in the stack S, and accordingly the set $\gamma_n$ is not in the stack S. Therefore, the calculating unit 12 performs the processes from Step N233.

In the subsequent processes at Steps N234 to N237, the calculating unit 12 performs processing for the intersection set $\gamma_{ni}$ of each set g' and the state set included in the set $\gamma_n$. It is only when g'={5, 6, 7} that $|\gamma_{ni}|>1$ holds true as indicated by the condition at Step N235. At this time, $\gamma_{ni}$={(5, 1), (6, 2), (7, 3)} is obtained.

At subsequent Step N236, the calculating unit 12 recursively executes the subprogram "search_equiv". This means that the calculating unit 12 starts the processes from Step N221 assuming γ={(5, 1), (6, 2), (7, 3)}. The process at Step N221 in the recursive processing provides g={5, 6, 7}. The process at Step N222 provides $\Sigma_g$=ϕ, and accordingly the calculating unit 12 performs the process at Step N225 to merge states included in the set γ, that is, the states 5, 6, and 7 into one state.

Figure 14:
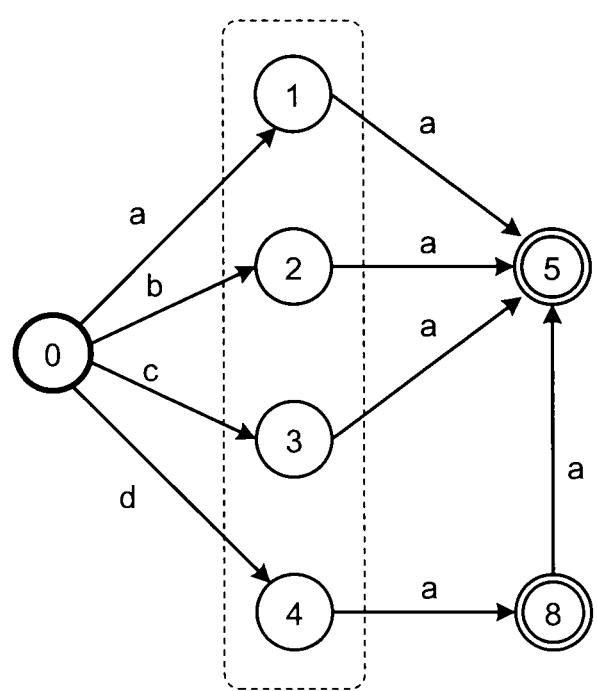
FIG. 14 is a diagram illustrating a configuration of the DFA shown in FIG. 11 after state merge.

Assuming that the state 5 is kept and the states 6 and 7 are merged into the state 5, the DFA shown in FIG. 12 becomes one shown in FIG. 14. In this example, the set $g_{erase}$ derived at Step N225 is $g_{erase}$={6, 7}.

Because $\Psi_{sc}$=ϕ, the calculating unit 12 determines that the condition at Step N268 in FIG. 6B is met and performs the process at Step N269. Because g={5, 6, 7} and G={{1, 2, 3, 4}, {5, 6, 7}} here, the set g is included as an element of the set G. Therefore, the process at Step N269 establishes G={{1, 2, 3, 4}}.

At Step N270, the calculating unit 12 obtains the set G' of the states included in the set $g_{erase}$, that is, those erased from among the elements of the set G including the erased states. At that time, the states 6 and 7 included in the set $g_{erase}$ are already erased from the set G in the process at Step N269. Therefore, G'={{1, 2, 3, 4}} is obtained. Because $\Psi_{sc}$=ϕ, the return value is ({{1, 2, 3, 4}},ϕ).

The calculating unit 12 assigns the return value of the subprogram "search_equiv" recursively executed at Step N236 to the sets G and $\Psi_{nsct}$, respectively. The calculating unit 12 further adds all elements included in the set $\Psi_{nsct}$ to the set $\Psi_{nsc}$ (Step N237). In this example, there is no element to be added because $\Psi_{nsct}=\phi$.

At subsequent Step N238, the calculating unit 12 creates a set of the transition destination states included in the set γ again. Because the transition destination states 5, 6, and 7 are merged into the state 5 by the previous recursive call, $g_n=\{5, 8\}$. The calculating unit 12 then performs the processes at Steps N240 to N243 for all element $q_n$ included in the set $g_n$ (Step N239).

A case in which $q_n=5$ is considered first. Because the calculating unit 12 assigns transition source states of the state 5 to the set $g_s$ at Step N240, $g_s=\{1, 2, 3\}$ is obtained. Accordingly, $|g_s|=3$ and then the calculating unit 12 determines the condition at Step N241 is met and performs the process at Step N242, resulting in $\eta=\{\{1, 2, 3\}\}$. When the calculating unit 12 performs the process at Step N243, |S|=1 and consequently $\Psi_{sc}=\{(\{(1, 1), (2, 2), (3, 3)\},1)\}$ is obtained.

A case in which $q_n=8$ is considered next. In this case, the set $g_s$ obtained at Step N240 is $g_s=\{4\}$ and consequently $|g_s|=1$ is obtained. Accordingly, the calculating unit 12 determines the condition at Step N241 is not met and thus does not perform the processes at Steps N242 and N243. Because $\Psi_{nsc}=\phi$, the processes at Steps N244 to N248 are not performed either. The calculating unit 12 then performs the process at Step N254, thereby obtaining $Y_{sc}=\{\{(\{(1, 1), (2, 2), (3, 3)\},1)\}\}$ and $H=\{\{\{1, 2, 3\}\}\}$.

In this way, the processing for all the input symbols included in the set $\Sigma_g$ is completed, and then the process at Step N255 is performed. In this example, $\eta=\{\{1, 2, 3\}\}$ is obtained and there is only one element in the set $\eta$. Therefore, the calculating unit 12 executes the subprogram "search_sharable_state" by using $g_s=\{1, 2, 3\}$ and $H\backslash\{\eta\}=\phi$ as arguments by means of the indistinguishable-set generating unit 123. As a result, $\{\{1, 2, 3\}\}$ is returned. There is no other element in the set $\eta$ to be subjected to "search_sharable_state", and thus $G_{share}=\{\{1, 2, 3\}\}$ is obtained.

The calculating unit 12 then executes the subprogram "merge_states" at Step N256 by using the state merging unit 121 to merge the states included in the set $G_{share}$ into one. Because D[|S|] as the dependency information is an empty set $\phi$ here, the state merging unit 121 simply merges the states included in the set $G_{share}$ into one set.

Figure 15:
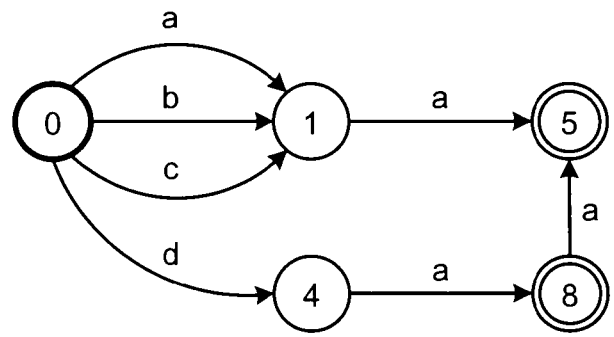
FIG. 15 is a diagram illustrating a configuration of the DFA shown in FIG. 14 after state merge.

Assuming that only the state 1 is kept and the states 2 and 3 are erased, the DFA shown in FIG. 14 becomes one as shown in FIG. 15. In this example, the set $g_{erase}$ derived at Step N256 is $g_{erase}=\{2, 3\}$.

At subsequent step N257, the calculating unit 12 erases the states included in the set $g_{erase}$ from the set $Y_{sc}$. At this time, the empty set $\phi$ is the only element in the set $Y_{sc}$ and accordingly the set $Y_{sc}$ is not changed. The same can be said for Step N258 and $\Psi_{sc}=\phi$. Further, no change occurs at Steps N259 to N265. At Step N266, D[|S|] is not changed either because D[|S|]=$\phi$ before this process is performed.

When the calculating unit 12 discards the top element (that is, γ at the storage location 1) in the stack S at subsequent step N267, the stack S=$\phi$.

Because $\Psi_{sc}=\phi$, the calculating unit 12 determines the condition at Step N268 is met, and thus a result of the process at Step N269 becomes G=$\phi$, because $g=\{1, 2, 3, 4\}$ and $G=\{\{1, 2, 3, 4\}\}$. The calculating unit 12 erases the states included in the set $g_{erase}$ from the set G at subsequent step N270. In this example, the set G is already an empty set and thus the set G' becomes an empty set $\phi$. Therefore, the return value at Step N251 becomes ($\phi$, $\phi$).

Returning to the main program "simin", the state-number reducing unit 10 assigns the return value from the subprogram "search_equiv" to the set G, resulting in G=$\phi$. Returning to Step N203 again, the state-number reducing unit 10 ends the processing of the main program "simin" because conditional evaluation indicates that the condition G≠$\phi$ is not met. According to the above processes, the number of states in the DFA as the processing target is minimized.

Figure 16:
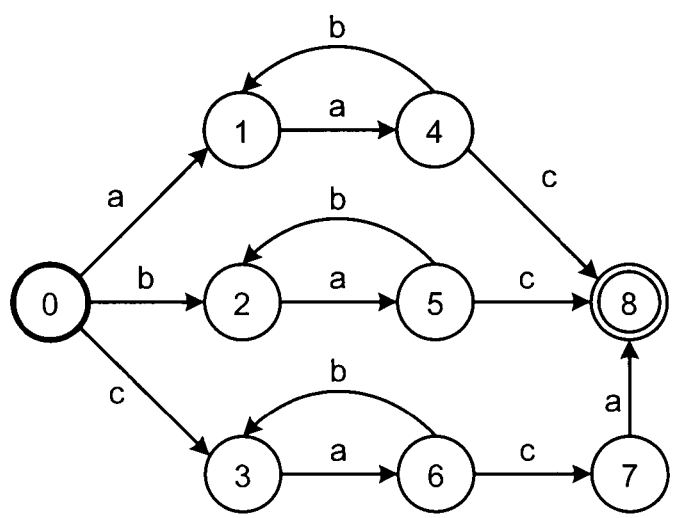
FIG. 16 is a diagram illustrating another example of the DFA.

An operation of the state-number reducing unit 10 for a processing target of a DFA having a cyclic path as shown in FIG. 16 is explained. The notation is the same as that in FIG. 11.

The state-number reducing unit 10 executes the main program "simin" for the DFA as the processing target as shown in FIG. 16. Details of relevant processes in each program are explained below.

The state-number reducing unit 10 first initializes the stack S and the table D to be empty sets $\phi$ (Step N201). The state-number reducing unit 10 then executes the subprogram "create_class" by using the state classifying unit 11 to classify the states included in the DFA as the processing target based on state finality and sets of input symbols associate with outgoing transitions (Step N202). As a result, it is found that the states are classified into a state 0, states 1, 2, 3, and 7, states 4, 5, and 6, and a state 8. Classes having one state are unnecessary and thus G={{1, 2, 3, 7}, {4, 5, 6}} is obtained.

Figure 17:
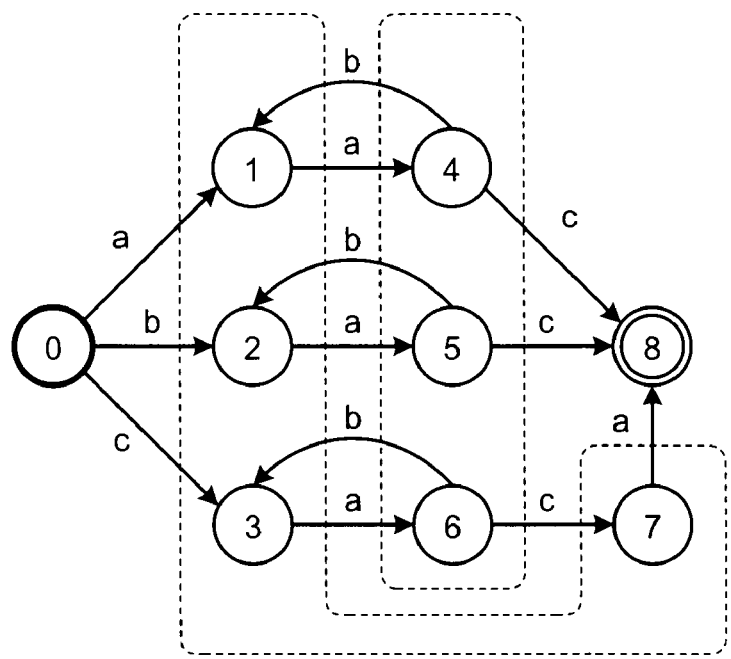
FIG. 17 is a diagram illustrating a configuration of the DFA shown in FIG. 16 after state classification.

In FIG. 17, each group enclosed in a dotted line corresponds to a class, and it is found that the states 1, 2, 3, and 7 fall into one class and the states 4, 5, and 6 fall into another class.

All states in the state set {1, 2, 3, 7} are not final states, and sets of input symbols of outgoing transitions are all {a}. All states in the state set {4, 5, 6} are not final states, and sets of input symbols of outgoing transitions are all {b, c}. Execution of the subprogram "search_equiv" for {4, 5, 6} is explained below.

At the time when the calculating unit 12 has performed the processes up to Step N223, γ={(4, 1), (5, 2), (6, 3)}, g={4, 5, 6}, and $\Sigma_g$={b, c}.

Figure 18:
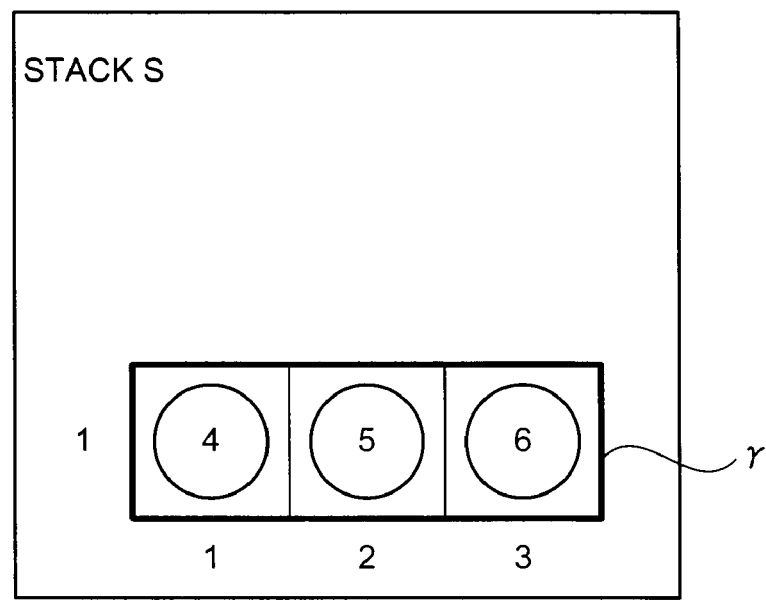
FIG. 18 is a diagram schematically illustrating a status of a stack S.

Because $\Sigma_g \neq \phi$ at that time, the processes from Step N227 are performed, and thus S={{(4, 1), (5, 2), (6, 3)}} is obtained at Step N228. FIG. 18 schematically depicts the stack S, showing a status immediately after Step N228. In FIG. 18, an element (set γ) recorded in the stack S is represented by a rectangle. The number of 2-tuples of state index and path index included in each element is represented by dividing the element into a number of small areas corresponding to the number of 2-tuples. In this example, the element in the stack S includes three 2-tuples of state index and path index, and thus the element is divided into three.

The number in each small area indicates a state index included in the 2-tuple corresponding to this small area. The number below each small area indicates a path index included in the 2-tuple corresponding to this small area. The number on the left of the element corresponds to a position of the element from the bottom of the stack S, and indicates a storage location of the element in the stack S.

When starting the processes from Step N229 from σ=b, for example, the calculating unit 12 obtains the set $γ_n$ of transition destination states of the set γ on the input symbol b in the process at Step N231. Specifically, the state 4 transits to the state 1 on the input symbol b, the state 5 transits to the state 2, and the state 6 transits to the state 3. The number of states is not reduced, and thus the path indices need to be maintained. Accordingly, 1 as the path index of the state 4 is assigned as the path index of the state 1. When other states are also processed in the same manner, $\gamma_n=\{(1, 1), (2, 2), (3, 3)\}$ is obtained.

The calculating unit 12 determines that the set $\gamma_n$ is not in the stack S at subsequent Step N232, which indicates that the processes from Step N233 are performed. At this time, $\gamma_{mi}=\{(1, 1), (2, 2), (3, 3)\}$ is the only set $\gamma_{mi}$ that satisfies $|\gamma_{mi}|>1$ at Step N235. Accordingly, the calculating unit 12 recursively executes the subprogram "search_equiv" for this set $\gamma_{mi}$.

Figure 19:
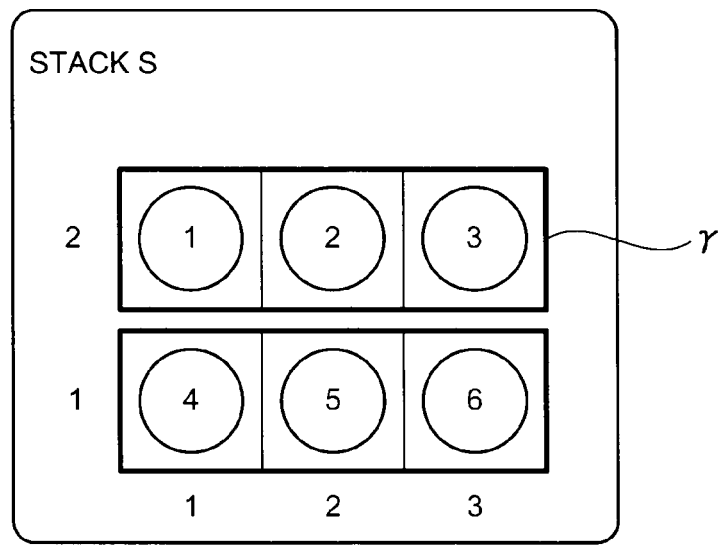
FIG. 19 is a diagram schematically illustrating another status of the stack S.

The process at Step N221 during the recursive execution establishes g=\{1, 2, 3\}. This is because the set γ provided as the argument at that time is $\gamma=\{(1, 1), (2, 2), (3, 3)\}$. Further, the process at Step N222 establishes $\Sigma_g=\{a\}$. Because $\Sigma_g \neq \phi$ at that time, the calculating unit 12 proceeds to the process at Step N227 and stores the set γ in the stack S at Step N228. That is, the stack S becomes S=\{\{(4, 1), (5, 2), (6, 3)\}, \{(1, 1), (2, 2), (3, 3)\}\}. It is assumed that an element nearer to the left side of the stack S is located nearer to the bottom of the stack. The stack S at that time has a status as shown in FIG. 19. FIG. 19 schematically depicts the stack S, showing a status immediately after Step N228 during the recursive processing.

Because the set $\Sigma_g$ includes only the input symbol "a", the calculating unit 12 performs the processes from Step N230 for σ=a. At Step N231, the calculating unit 12 obtains $\gamma_n=\{(4, 1), (5, 2), (6, 3)\}$. Accordingly, the calculating unit 12 determines that the set $\gamma_n$ is in the stack S at Step N232 and thus comes to perform the processes from Step N249.

At Step N250, the calculating unit 12 obtains $\psi_{sc}=\{(1, 4), (2, 5), (3, 6)\}$. A first number of each 2-tuple indicates a dependence source state, and a second number thereof indicates a dependence destination state. The calculating unit 12 then obtains $\Psi_{sc}=\{(\{(1, 4), (2, 5), (3, 6)\},1)\}$ in the process at subsequent Step N251. It indicates that the dependence source states are the states 1, 2, and 3 included in the set γ, and the dependence destination states as the corresponding transition destination states are the states 4, 5, and 6, respectively. The reason why the last value is 1 is that the storage location of the set $\gamma_n$ found in the stack S is at the bottom of the stack, that is, 1.

At this time, $\gamma \neq \gamma_n$, that is, no self transition occurs. Accordingly, the calculating unit 12 performs the process at Step N254, instead of the process at Step N253, to obtain $Y_{sc}=\{\{(\{(1, 4), (2, 5), (3, 6)\},1)\}\}$ and H\{\{ \}\}.

At subsequent step N255, the calculating unit 12 executes "search_sharable_state" by using the indistinguishable-set generating unit 123 to search for indistinguishable states from among the elements of the set H. In this example, the element of the set H is only the empty set, and thus $G_{share}=\phi$. Accordingly, no state can be merged in the process at Step N256, and consequently $g_{erase}=\phi$.

Because $g_{erase}=\phi$, the set $Y_{sc}$ is not changed even when the calculating unit 12 performs the process at Step N257. Because the size of the set $Y_{sc}$ is 1, only the processes at Steps N321 and N322 are performed in the subprogram "search_sharable_state_candidate" to be executed at Step N258. Consequently, $\Psi_{sc}=\{(\{(1, 4), (2, 5), (3, 6)\},1)\}$ is obtained.

The calculating unit 12 then performs the process at Step N259. At that time, the set $\Psi_{sc}$ has one element, for which $x_{level}=1$ and |S|=2. Therefore, $x_{level}<|S|$ and thus the set $\Psi_{sc}$ is not changed. The calculating unit 12 then records the dependence relations expressed by the set $\Psi_{sc}$ in the table D at Steps N260 and N261. As a result, D[1]=\{\{(1, 4), (2, 5), (3, 6)\}\} is obtained. This is shown in FIG. 20.

Figure 20:
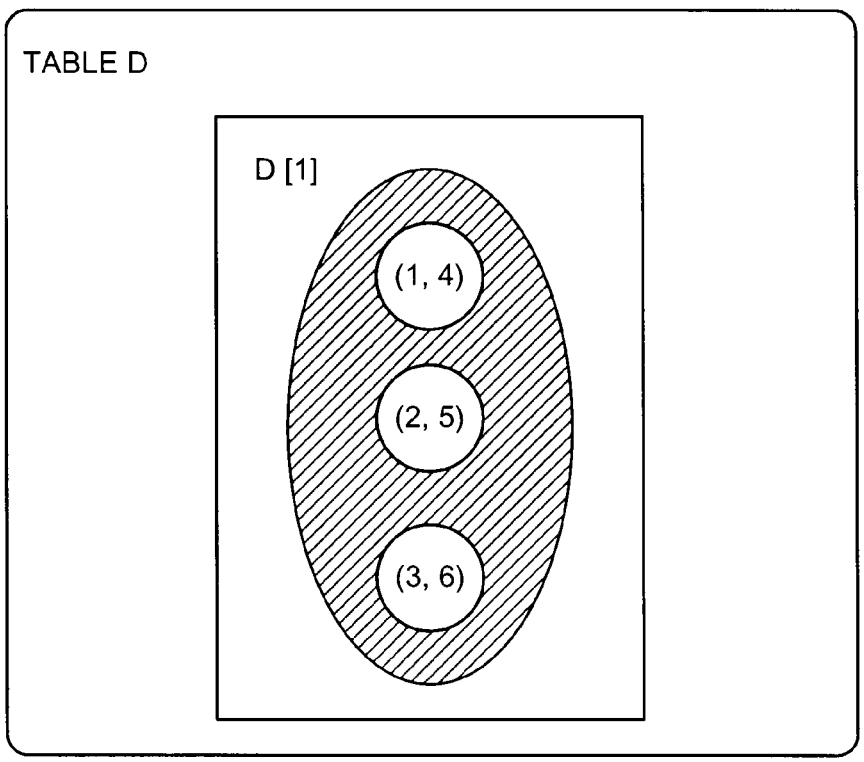
FIG. 20 is a diagram schematically illustrating a status of a table D.

FIG. 20 schematically depicts a status of the table D in which the 2-tuples (dependence source state, dependence destination state) are circled. A set having these 2-tuples as elements is represented as a hatched area, and a set having this set as an element is represented as a rectangular area surrounding the hatched area.

Because D[2]=φ, no change occurs even when the calculating unit 12 performs the processes at Steps N262 to N266. When the calculating unit 12 removes the top element in the stack S at subsequent Step N267, S=\{\{\{(4, 1), (5, 2), (6, 3)\}\}\} is obtained. Because the set $\Psi_{sc}$ is not an empty set φ at that time, the calculating unit 12 determines that the condition at Step N268 is not met and does not perform the process at Step N269.

At Step N270, $g_{erase}=\phi$ and accordingly there is no change in the set G. Therefore, G'=\{\{1, 2, 3, 7\}, \{4, 5, 6\}\} is obtained. The calculating unit 12 returns the set G' and the set $\Psi_{sc}$ obtained in the recursive processing as return values. Returning back from the recursive processing at Step N236, G=\{\{1, 2, 3, 7\}, \{4, 5, 6\}\} and $\Psi_{nsct}=\{(\{(1, 4), (2, 5), (3, 6)\},1)\}$ are obtained. That is, no change occurs in the set G.

At Step N237, the calculating unit 12 obtains $\Psi_{nsc}=\{(\{(1, 4), (2, 5), (3, 6)\},1)\}$. Because there is no other set g' to be processed, the calculating unit 12 proceeds to the process at Step N238. No states are merged into one in the recursive processing at Step N236, and thus the set of the transition destination states becomes $g_n=\{1, 2, 3\}$. Accordingly, no change occurs in the processes at Steps N239 to N243. This is because the numbers of transition source states corresponding to the input symbol b of the states included in the set $g_n$ are all one.

The calculating unit 12 then performs the processes at Step N244 to N248. Because the set $\Psi_{nsc}$ has one element, the process in this loop is performed only once assuming that $\psi_{nsc}=\{(1, 4), (2, 5), (3, 6)\}$ and $x_{level}=1$.

The dependency information of the states included in the set g is created at Step N245, resulting in $\psi_{sc}=\{(4, 4), (5, 5), (6, 6)\}$. At this time, |S|=1, which indicates that the condition at Step N246 is met, and the calculating unit 12 obtains η=\{\{4, 5, 6\}\} at Step N247. The calculating unit 12 then obtains $\Psi_{sc}=\{(\{(4, 4), (5, 5), (6, 6)\},1)\}$ in the process at Step N248. At Step N254, the calculating unit 12 obtains $Y_{sc}=\{\{(\{(4, 4), (5, 5), (6, 6)\},1)\}\}$ and H=\{\{\{4, 5, 6\}\}\}.

Because $\Sigma_g=\{b, c\}$ at that time and the process related to the input symbol b has been previously completed, the process related to the input symbol c is performed, and then $\gamma_n=\{(7, 1), (8, 2)\}$ at Step N231. The path indices are changed because the size is reduced as compared to |γ| and reassignment of the path indices can be performed. The reason is described in the explanations of the subprogram "search_equiv".

At this time, G=\{\{\{1, 2, 3, 7\}, \{4, 5, 6\}\}. Even when intersection sets of the set G and the states recorded as left values of the 2-tuples as the elements of the set $\gamma_n$ are calculated then, no intersection set has the size equal to or larger than two. Therefore, no change occurs at Steps N233 to N237. The process at Step N238 provides a result $g_n=\{7, 8\}$.

In the loop at Steps N239 to N243, there is only one transition source state when $q_n=7$. Accordingly, only a case in which $q_n=8$ needs to be considered. When $q_n=8$, $g_s=\{4, 5\}$ at Step N240. At this time, $|g_s|=2$, which is larger than one. Therefore, the condition at Step N241 is met and the processing proceeds to Step N242. At Step N242, η=\{\{4, 5\}\}, and at Step N243, $\Psi_{sc}=\{(\{(4, 4), (5, 5)\},1)\}$.

Because the set $\Psi_{nsc}$ is an empty set φ, no processing is performed at Steps N244 to N248. This is because the set $\Psi_{nsc}$ has become an empty set φ in the process at Step N230 in the first line of the loop corresponding to σ=c.

When the calculating unit 12 then performs the process at Step N254, $Y_{sc}=\{\{(\{(4, 4), (5, 5), (6, 6)\},1)\}, \{(\{(4, 4), (5, 5)},1)}} and H={{{4, 5, 6}}, {{4, 5}}} are obtained. Because processing for all the input symbols included in the set $\Sigma_g$ is completed then, the calculating unit 12 proceeds to the process at Step N255.

At subsequent Step N255, the calculating unit 12 selects one element from the set H and sets the selected element in the set η. It is assumed here that the calculating unit 12 selects η={{4, 5, 6}}. In this case, because the set η includes one element, the calculating unit 12 executes the subprogram "search_sharable_state" for $g_s$={4, 5, 6} by using the indistinguishable-set generating unit 123. H\{η}={{{4, 5}}} is obtained here.

When the subprogram "search_sharable_state" is executed, $g_{start}$={4, 5, 6} and H={{{4, 5}}}, because the set $g_s$ and H\{η} are provided as arguments. The set H is not an empty set φ, and accordingly the processing is started from Step N293 in FIG. 8.

At Step N293, the indistinguishable-set generating unit 123 extracts an arbitrary element from the set H. Because the set H has only one element at that time, η={{4, 5}}. Further, because the set η has one element, the processes at Steps N296 to N298 are performed only once for g'={4, 5}.

The indistinguishable-set generating unit 123 then performs the process at Step N296 to obtain $g_{is}$={4, 5, 6}∩{4, 5}={4, 5}. Because |$g_{is}$|=2 at that time, the indistinguishable-set generating unit 123 determines the condition at Step N297 is met and performs the process at Step N298. The indistinguishable-set generating unit 123 then recursively executes the subprogram "search_sharable_state" at Step N298. When the subprogram is recursively called, arguments thereof are $g_{start}$={4, 5} and H=φ. Therefore, the condition at Step N291 is met and {{4, 5}} is returned as a return value at Step N292. Returning back from the recursive call, a result is added to the set $G_s$ at Step N298, resulting in $G_s$={{4, 5}}. The set $G_s$ is returned as a return value at Step N299.

When the subprogram "search_sharable_state" is completed, the processing returns to Step N255. Because the set η has one element, there is no need to execute "search_sharable_state" any more. Therefore, $G_{share}$={{4, 5}} is obtained.

At subsequent Step N256, the calculating unit 12 merges elements included in the $G_{share}$. Because |S|=1 at that time, D[1]={{(1, 4), (2, 5), (3, 6)}}. When the calculating unit 12 executes the subprogram "merge_states" by using the state merging unit 121, arguments at that time are $G_{share}$={{4, 5}} and $D_{elm}$={{(1, 4), (2, 5), (3, 6)}}. The size of the set $G_{share}$ is 1, and accordingly the state merging unit 121 selects $g_s$={4, 5} at Step N302 in FIG. 9.

The state merging unit 121 extracts an arbitrary element from the set $g_s$ and assigns the element to r at Step N303. The extracted state is a representative of a set of states to be merged into one (representative state) and left undeleted. When it is assumed here that r=4, the state merging unit 121 merges states included in $g_s$\{r} into r=4 at Steps N304 to N306. In this example, $q_e$=5 and accordingly the state 5 is merged into the state 4. As a result, the DFA shown in FIG. 16 becomes one as shown in FIG. 21.

Figure 21:
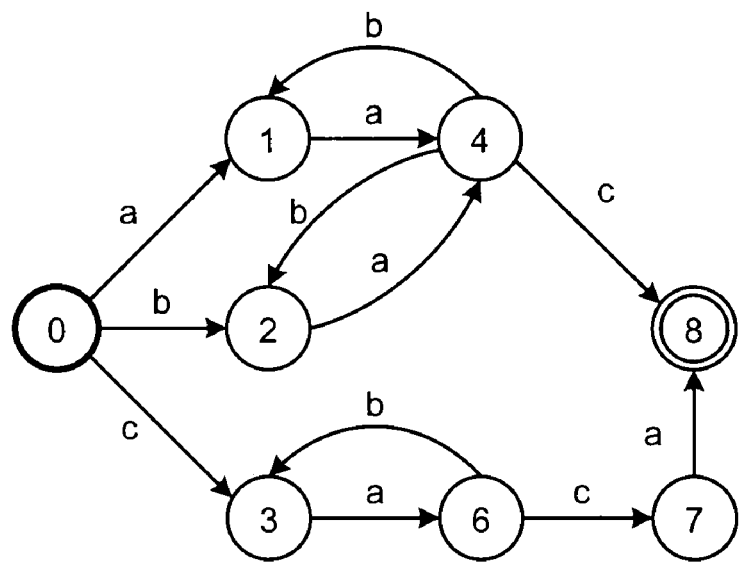
FIG. 21 is a diagram illustrating a configuration of the DFA shown in FIG. 16 after state merge.

As shown in FIG. 21, the state 5 is unneeded and becomes a target for erasure due to the merge. The state merging unit 121 then adds $q_e$=5 to $Q_e$ at Step N306. Accordingly, $Q_e$={5} is obtained.

The state merging unit 121 then performs the processes at Steps N307 to N313 for each element in the set $D_{elm}$. Because one element is included in $D_{elm}$ at that time, it is only necessary to process ψ={(1, 4), (2, 5), (3, 6)}. At Step N308, a set of dependence source states $q_s$ of 2-tuples included in ψ, having the states included in the set $g_s$ as dependence destination states $q_d$ is obtained.

Because $g_s$={4, 5}, a value of a first element (dependence source state) of a 2-tuple as an element of ψ, of which a second element (dependence destination state) is 4 is 1. Similarly, a value of a first element (dependence source state) of a 2-tuple of which a second element (dependence destination state) is 5 is 2. Therefore, g={1, 2}. Because |g|=2, the condition at Step N309 is met, and accordingly the state merging unit 121 performs the processes from Step N310.

At Step N310, the state merging unit 121 selects a representative state. It is assumed here that the state 1 is selected. The rest of the states included in the set g is only the state 2, and thus the states 1 and 2 are merged at Step N312 as shown in FIG. 22.

Figure 22:
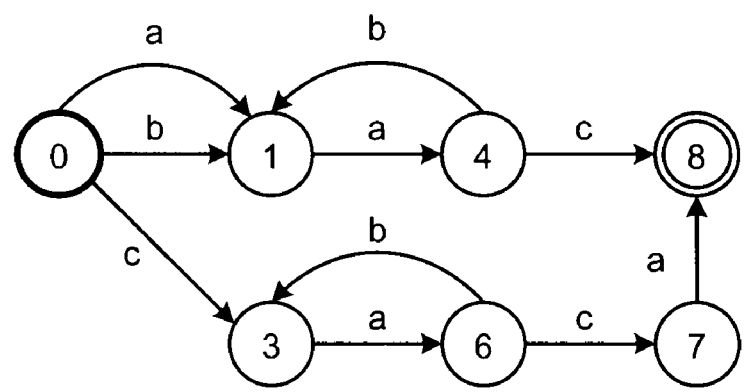
FIG. 22 is a diagram illustrating a configuration of the DFA shown in FIG. 21 after state merge.

As shown in FIG. 22, the state 2 is unneeded and becomes an erasure target due to the merge. Therefore, the state merging unit 121 adds $q_e$=2 to $Q_e$ at Step N313. As a result, $Q_e$={2, 5}. The state merging unit 121 then determines that no other element is included in the set $G_{share}$. Accordingly, the processing proceeds to Step N314 and the set $Q_e$ of erased states is returned as a return value. Because the execution of the subprogram "merge_states" is completed, the processing returns to Step N256. The return value is assigned to the set $g_{erase}$, resulting in $g_{erase}$={2, 5}.

At Step N257, the calculating unit 12 removes 2-tuples including the erased states from the set $Y_{sc}$. While $Y_{sc}$={{({(4, 4), (5, 5), (6, 6)},1)}, {({(4, 4), (5, 5),},1)}} before the process at Step N257, $Y_{sc}$={{({(4, 4), (6, 6)},1)}, {({(4, 4)}, 1)} is obtained after the process.

The calculating unit 12 extracts one element from the set $Y_{sc}$ as a set Ψ to perform the process at Step N258. It is assumed here that Ψ={({(4, 4)},1)}. Further, ψ={(4, 4)} is obtained from the 2-tuple as an element of Ψ. However, because ψ includes only one element, the condition at Step N330 is not met even when the subprogram "search_sharable_state_candidate" is executed, and consequently $Ψ_{sc}$=φ. Even when the calculating unit 12 performs the process at Step N259, $Ψ_{sc}$=φ and thus the processes at Step N260 to N265 are not performed.

While D[1]={{(1, 4), (2, 5), (3, 6)}}, this information is not required any more, and therefore the calculating unit 12 replaces D with an empty set φ in the process at Step N264. At subsequent Step N267, the calculating unit 12 erases the top element stored in the stack S and proceeds to the process at Step N268. Because $Ψ_{sc}$=φ at that time, the condition at Step N268 is met and the processing proceeds to Step N269. Specifically, because g={4, 5, 6} and G={{{1, 2, 3, 7}, {4, 5, 6}}, G={{1, 2, 3, 7}}.

Because $g$=$_{erase}${2, 5}, the calculating unit 12 removes the states included in the set $g_{erase}$ from the elements of the set G at Step N270, resulting in G'={{1, 3, 7}}. Accordingly, a return value at Step N271 becomes ({{1, 3, 7}},φ) and the processing returns to Step N205 of "simin". At Step N205, the state-number reducing unit 10 assigns a return value of "search_equiv" to the set G. As a result, G={{1, 3, 7}} is obtained. Therefore, the condition at Step N203 is met, and then the state-number reducing unit 10 performs the process at Step N204, resulting in g={1, 3, 7}.

At subsequent Step N205, the state-number reducing unit 10 executes "search_equiv" for g={1, 3, 7} by using the calculating unit 12 as before. When g={1, 3, 7}, the condition at Step N235 of "search_equiv" is not met, and the condition at Step N241 is not met, either. On the other hand, the condition at Step N268 is met, and thus the calculating unit 12 removes g={1, 3, 7} from the set G, which brings the set G to an empty set φ (Step N269).

A return value of "search_equiv" becomes G'=(φ,φ), and then the processing returns again to Step N205 of "simin". At Step N205, the state-number reducing unit 10 assigns the value of "search_equiv" to the set G. As a result, G=φ and therefore the condition at Step N203 is not met, resulting in an end of the processing. According to the above processes, the number of states in the DFA as the processing target is minimized.

Figure 23:
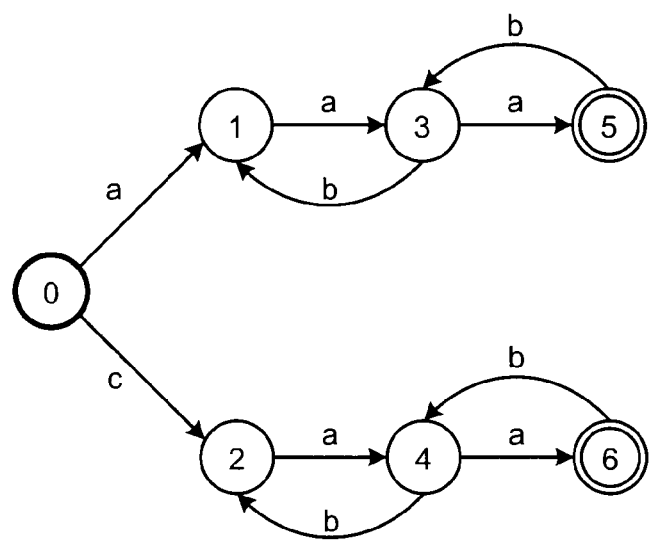
FIG. 23 is a diagram illustrating another example of the DFA.

An operation of the state-number reducing unit 10 when the dependency information is to be renewed is explained. In FIG. 23, notation is the same as that in FIG. 11. Explanations are given below assuming the DFA shown in FIG. 23 as a processing target.

Figure 24:
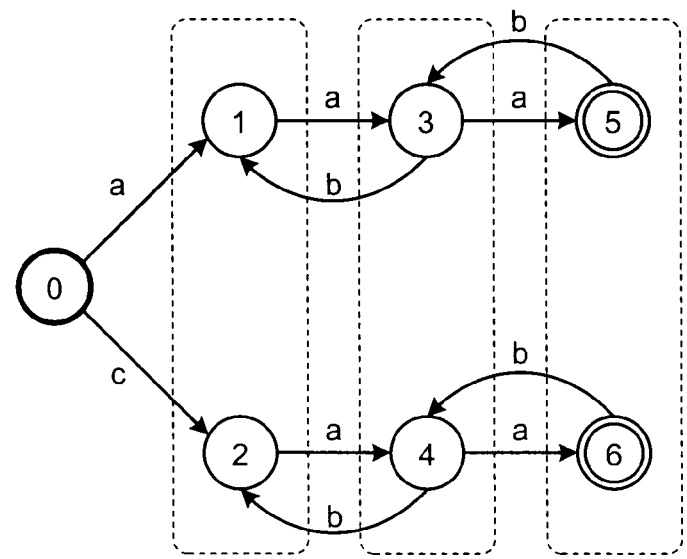
FIG. 24 is a diagram illustrating a configuration of the DFA shown in FIG. 23 after state classification.

The state-number reducing unit 10 first executes the main program "simin" for the DFA as the processing target as shown in FIG. 23. When the states in the DFA are classified, G={{1, 2},{3, 4},{5, 6}} is obtained. FIG. 24 depicts a configuration of the DFA shown in FIG. 23 after the state classification. Each group enclosed in a dotted line corresponds to a class. It is found that states 1 and 2, states 3 and 4, and states 5 and 6 fall into one class, respectively.

It is assumed here that the subprogram "search_equiv" is executed for {1, 2} first. The processes at Steps N221 to N228 establish γ={(1, 1), (2, 2)}, g={1, 2}, $\Sigma_g$={a}, and S={{(1, 1), (2, 2)}}. The process at subsequent Step N229 establishes σ=a, and the process at Step N231 establishes $\gamma_n$={(3, 1), (4, 2)}. The set $\gamma_n$ is not in the stack S, and then the processes at Steps N233 to N248 are performed.

In the processes at Steps N233 to N237, only $\gamma_{ni}$={(3, 1), (4, 2)} meets the condition at Step N235. Accordingly, the calculating unit 12 recursively executes the subprogram "search_equiv" for this set $\gamma_{ni}$. In the processes at Step N221 to N228 in the recursive processing, γ={(3, 1), (4, 2)}, g={3, 4}, $\Sigma_g$={a, b}, and S={{(1, 1), (2, 2)}, {(3, 1), (4, 2)}} are obtained.

In subsequent processes from Step N229, it is first assumed that σ=a. $\gamma_n$={(5, 1), (6, 2)} is then obtained at Step N231. This set $\gamma_n$ is not in the stack S either, and accordingly the processes at Step N233 to N248 are performed.

In the processes at Step N233 to N237, only $\gamma_{ni}$={(5, 1), (6, 2)} meets the condition at Step N235. Therefore, the calculating unit 12 further recursively executes the subprogram "search_equiv" for this set $\gamma_{ni}$. In the processes at Steps N221 to N228 in the recursive processing, γ={(5, 1), (6, 2)}, g={5, 6}, $\Sigma_g$={b}, and S={{(1, 1), (2, 2)}, {(3, 1), (4, 2)}, {(5, 1), (6, 2)}} are obtained.

Subsequent processes from Step N229 are performed assuming that σ=b. $\gamma_n$={(3, 1), (4, 2)} is then obtained at Step N231. This set $\gamma_{ni}$ is in the stack S, and accordingly the processes from Step N249 are performed. $\psi_{sc}$={(5, 3), (6, 4)} is obtained at Step N250, and $\Psi_{sc}$={({(5, 3), (6, 4)},2)} is obtained at Step N251. The condition at Step N252 is not met here, and then the process at Step N254 is performed.

At Step N254, $Y_{sc}$={{({(5, 3), (6, 4)},2)}} and H={{ }} are obtained. Because no other input symbol to be processed is included in the set $\Sigma_g$, the process at Step N255 is then performed. The set H includes only one empty set, and accordingly a result of the process at Step N255 becomes $G_{share}$=φ. Therefore, there is no state to be merged into one at Step N256, and $g_{erase}$=φ. Because $g_{erase}$=φ, no change occurs in the set $Y_{sc}$ in the process at Step N257.

At subsequent Step N258, $\Psi_{sc}$={({(5, 3), (6, 4)},2)} is obtained. Because |S|=3 at that time, no change occurs in the set $\Psi_{sc}$ at Step N259. The processes at Steps N260 and N261 establish D[2]={{(5, 3), (6, 4)}}. Because D[3]=φ, the processes at Steps N264 and N265 are not performed. Execution of the process at Step N266 does not change D[3], and D[3] remains as the empty set φ.

At Step N267, the top element in the stack S is removed, resulting in S={{(1, 1), (2, 2)}, {(3, 1), (4, 2)}}. Because the set $\Psi_{sc}$ is not an empty set, the condition at Step N268 is not met and then the process at Step N269 is not performed. Because the set $g_{erase}$ is an empty set, G'={{1, 2}, {3, 4}, {5, 6}} is obtained at Step N270. The set G' and the set $\Psi_{sc}$ are returned as return values at Step N271.

Because the processing returns to Step N236, G={{1, 2}, {3, 4}, {5, 6}} and $\Psi_{nsc}$={({(5, 3), (6, 4)},2)} are obtained based on the obtained return values. The process at Step N237 establishes $\Psi_{nsc}$={({(5, 3),(6, 4)},2)}, and the process at Step N238 establishes $g_n$={5, 6}.

The condition at Step N241 is not met in the processes at Steps N239 to N243, and accordingly the processes at Steps N242 and N243 are not performed. Because the set $\Psi_{nsc}$ includes one element, the process at Step N244 establishes $\psi_{nsc}$={(5, 3), (6, 4)} and $x_{level}$=2, and the processes at Steps N245 to N248 are performed with respect thereto.

The process at Step N245 establishes $\psi_{sc}$={(3, 3), (4, 4)}. Because |S|=2, the condition at Step N246 is met and then η={{3, 4}} at Step N247. At Step N248, $\Psi_{sc}$={({(3, 3), (4, 4)},2)}. At Step N254, $Y_{sc}$={{({(3, 3), (4, 4)},2)}} and H={{{3, 4}}} are obtained.

Because the processing for "a" of $\Sigma_g$={a, b} is completed, the processes at Step N230 to N254 are then performed assuming that σ=b. At Step N231, $\gamma_n$={(1, 1), (2, 2)}. The set $\gamma_n$ is in the stack S at that time, the condition at Step N232 is not met and then the processes from Step N250 are performed.

$\psi_{sc}$={(3, 1), (4, 2)} is obtained at Step N250, and $\Psi_{sc}${({(3, 1), (4, 2)},1)} is obtained at Step N250. Because the condition at Step N252 is not met, the process at Step N253 is not performed. At subsequent Step N254, $Y_{sc}$={{({(3, 3), (4, 4)},2)}, {({(3, 1), (4, 2)},1)}} and H={{{3, 4}}, { }} are obtained.

Because the processing for all the input symbols included in the set $\Sigma_g$ is completed, the process at Step N255 is performed. At Step N255, $G_{share}$=φ. Accordingly, there is no state to be merged at Step N256, and therefore $g_{erase}$=φ. Because $g_{erase}$=φ, no change occurs in the set $Y_{sc}$ at Step N257.

At subsequent Step N258, one element is first selected from the set $Y_{sc}$. It is assumed here that Ψ={({(3, 3), (4, 4)},2)} is selected. The calculating unit 12 executes "search_sharable_state_candidate" using ψ={(3, 3), (4, 4)}, $x_{level}$=2, and $Y_{sc}$\{Ψ}={{({(3, 1), (4, 2)},1)}} as first, second, and third arguments, respectively, by means of the indistinguishable-candidate-set generating unit 124.

Because the condition at Step N321 is not met in "search_sharable_state_candidate", the process at Step N322 is not performed and one element is then selected from the set Y at subsequent Step N323. The set Y has only one element at that time. Therefore, Ψ={({(3, 1), (4, 2)},1)}. Because the size of the set Ψ is 1, ψ={(3, 1), (4, 2)} and $x_{level}$=1 at Step N325. Because $x_{start}$=2, the condition at Step N326 is not met. The process at Step N329 is then performed. At this time, $\psi_{start}$={(3, 3), (4, 4)} is obtained, and accordingly $\psi_{is}$={(3, 1), (4, 2)} is obtained.

Because |$\psi_{is}$|=2, the process at Step N331 is performed, resulting in $x_{is}$=1. At Step N332, "search_sharable_state_candidate" is recursively excuted with arguments as $\psi_{is}$={(3, 1), (4, 2)}, $x_{is}$=1, and Y\{Ψ}=φ. The condition at Step N321 is then met, and accordingly the processing proceeds to Step N332 with {({(3, 1), (4, 2)},1)} as a return value at Step N322. As a result, $\Psi_s$={({(3, 1), (4, 2)},1)}. Because there is no other element to be processed in the set Ψ, the process at Step N333 is performed, and then the processing returns to the process at Step N258 of "search_equiv" using the set $\Psi_s$ as a return value.

There is no element to be processed in the set $\Psi$ at Step N258, and accordingly $\Psi_{sc}=\{(\{(3, 1), (4, 2)\}, 1)\}$ is obtained. Because $|S|=2$, the set $\Psi_{sc}$ is not changed in the process at Step N259. The processes at Steps N260 and N261 establish $D[1]=\{\{(3, 1), (4, 2)\}\}$.

The processes at Steps N262 to N265 are then performed. These processes change dependence destination states in the dependence relations recorded in D[2]. Because $\Psi_{sc}=\{(\{(3, 1), (4, 2)\}, 1)\}, \psi_{sc}=\{(3, 1), (4, 2)\}$ and $x_{level}=1$ at Step N262. At Step N263, $d=\{(5, 3), (6, 4)\}$, and at Step N264, $d_p=\{(5, 1), (6, 2)\}$.

The 2-tuple (5, 3) included in d is explained. The 2-tuple (5, 3) indicates that the dependence source destination is the state 5 and the dependence destination state is the state 3. An element of $\psi_{sc}$ having the state 3 as the dependence source state is (3, 1). The dependence destination state of this 2-tuple is the state 1. Therefore, the dependence destination state of the 2-tuple (5, 3) included in d turns out to be the state 1, and accordingly the 2-tuple (5, 1) is recorded in $d_p$. The other 2-tuple (6, 2) in $d_p$ is obtained in the same manner.

At subsequent Step N265, $D[1]=\{\{(3, 1), (4, 2)\}, \{(5, 1), (6, 2)\}\}$ is obtained. There is no other element to be processed in the set $\Psi_{sc}$ or D[2] and thus the process at Step N266 is performed, resulting in $D[2]=\phi$. The process at Step N267 establishes $S=\{\{(1, 1), (2, 2)\}\}$.

Because $\Psi_{sc}$ is not an empty set, the condition at Step N268 is not met and the process at Step N269 is not performed. Because no state is erased, $G'=\{\{1, 2\}, \{3, 4\}, \{5, 6\}\}$ as a result of the process at Step N270. At subsequent Step N271, the set G' and the set $\Psi_{sc}$ are returned as return values. The processing then returns again to Step N236, and accordingly $G=\{\{1, 2\}, \{3, 4\}, \{5, 6\}\}$ and $\Psi_{nsct}=\{(\{(3, 1), (4, 2)\}, 1)\}$ are obtained based on the obtained return values.

$\Psi_{nsc}=\{(\{(3, 1), (4, 2)\}, 1)\}$ is obtained at Step N237, and $g_n=\{3, 4\}$ is obtained at Step N238. The condition at Step N241 is not met in the processes at Steps N239 to N243, and the processes at Steps N242 and N243 are not performed.

Because the set $\Psi_{nsc}$ has one element, the processes at Steps N244 to N248 are performed. The process at Step N245 establishes $\psi_{sc}=\{(1, 1), (2, 2)\}$. Because $x_{level}=1$ and $|S|=1$ at that time, the condition at Step N246 is met, and $\eta=\{\{1, 2\}\}$ at Step N247. At Step N248, $\Psi_{sc}=\{(\{(1, 1), (2, 2)\}, 1)\}$. At Step N254, $Y_{sc}=\{\{(\{(1, 1), (2, 2)\}, 1)\}\}$ and $H=\{\{1, 2\}\}$ are obtained. No other element to be processed remains in the set $\Sigma_g$, and then the processing proceeds to Step N255.

When the process at Step N255 is performed, $G_{share}=\{\{1, 2\}\}$. At subsequent Step N256, the calculating unit 12 executes the subprogram "merge_states" by using the state merging unit 121. At that time, $G_{share}=\{\{1, 2\}\}$, and $D_{elm}=\{\{(3, 1), (4, 2)\}, \{(5, 1), (6, 2)\}\}$.

In "merge_states", the set $G_{share}$ has one element. When this element is selected at Step N302, $g_s=\{1, 2\}$. The processes at Steps N303 to N313 are then performed. At Step N303, one of states included in the set $g_s$ is selected. It is assumed here that r=1 is selected. Because the set $g_s$ includes only the state 2 other than the state r, the state 2 is merged into the state r in the process at Step N305. The state 2 that has become unneeded is added to $Q_e$ at Step N306, resulting in $Q_e=\{2\}$.

Because the size of $D_{elm}$ is 2, the processes at Steps N308 to N313 are performed for each element of $D_{elm}$. It is assumed here that $\psi=\{(3, 1), (4, 2)\}$ is first processed. Because $g=\{3, 4\}$ at Step N308, the condition at Step N309 is met. Accordingly, an arbitrary element is selected from the set g at subsequent Step N310. It is assumed here that r'=3.

At Step N312, states in the set g other than r' are merged into the state r'. It is only necessary to consider here a case in which $q_e=4$. Therefore, the state 4 is merged into the state 3. At subsequent Step N313, $Q_e=\{2, 4\}$.

The processing is then performed for $\psi=\{(5, 1), (6, 2)\}$. When the processing is performed as in the previous processing, $g=\{5, 6\}$ is obtained at Step N308. Assuming that r'=5 at Step N310, the state 6 is merged into the state 5 at Step N312. At Step N313, $Q_e=\{2, 4, 6\}$.

Because the processing for all the sets $G_{share}$ and $D_{elm}$ is completed, the processing returns to Step N256 of "search_equiv" using $Q_e$ as a return value at Step N314. This establishes $g_{erase}=\{2, 4, 6\}$.

At Step N257, 2-tuples included in the set $g_{erase}$ are removed from the set $Y_{sc}$, resulting in $Y_{sc}=\{\{(\{(1, 1)\}, 1)\}\}$. Two or more 2-tuples are required for state merge. Therefore, sets having only one 2-tuple are not required and can be erased at that time. At Step N258, $\Psi_{sc}=\{(\{(1, 1)\}, 1)\}$.

Because $|S|=1$, $\Psi_{sc}=\phi$ at Step N259. Therefore, the processes at Steps N260 to N265 cause no change. At subsequent Step N266, $D[1]=\phi$, and at Step N267, $S=\phi$. Because the set $\Psi_{sc}$ is an empty set $\phi$, the condition at Step N268 is met and then elements corresponding to the set g are removed from the set G in the process at Step N269. Because $g=\{1, 2\}$ and $G=\{\{1, 2\}, \{3, 4\}, \{5, 6\}\}$ at that time, $G=\{\{3, 4\}, \{5, 6\}\}$ is obtained.

When states included in $g_{erase}=\{2, 4, 6\}$ are removed from $G=\{\{3, 4\}, \{5, 6\}\}$ at Step N270, $\{\{3\}, \{5\}\}$ remains. Because sets having element sizes that are equal to or smaller than one are not included, $G'=\phi$ is obtained in the end. Accordingly, a return value at Step N271 becomes $(\phi, \phi)$.

Figure 25:
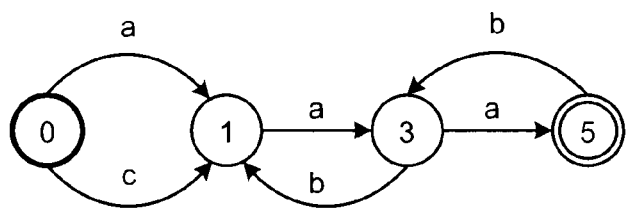
FIG. 25 is a diagram illustrating a final configuration of the DFA shown in FIG. 23 after state merge.

Returning to Step N205 of "simin", $G=\phi$. This does not meet the condition at Step N203 and thus the processing is ended. FIG. 25 depicts a final configuration of the DFA shown in FIG. 23 after the state merge. According to the above processes, the number of states in the DFA as the processing target is minimized.

According to the first embodiment, because it is unnecessary to have combinations of indistinguishable states as a set of 2-tuples of states, a large memory area is not used. Further, the states included in the DFA are merged in a stepwise manner, and accordingly the number of states in the DFA can be incrementally reduced.

The states that are determined distinguishable from all other states are removed from the set G at that time. Therefore, determination whether the states that have been determined distinguishable are distinguishable is not performed again, which increases the processing efficiency.

In the configuration of the first embodiment, when the number of states on one cyclic path is increased, much time is required for the processing. Specifically, a set of states as indistinguishable candidates is not removed from the set G, and accordingly even when some states have already turned out to be indistinguishable candidates, "search_equiv" is executed plural times for the set of states. In a second embodiment of the present invention, a mode that is adapted not to perform the processing plural times for a set of states that have turned out to be indistinguishable candidates is explained. Like constituent elements as those in the first embodiment are denoted by like reference characters and explanations thereof will be omitted.

Figure 26:
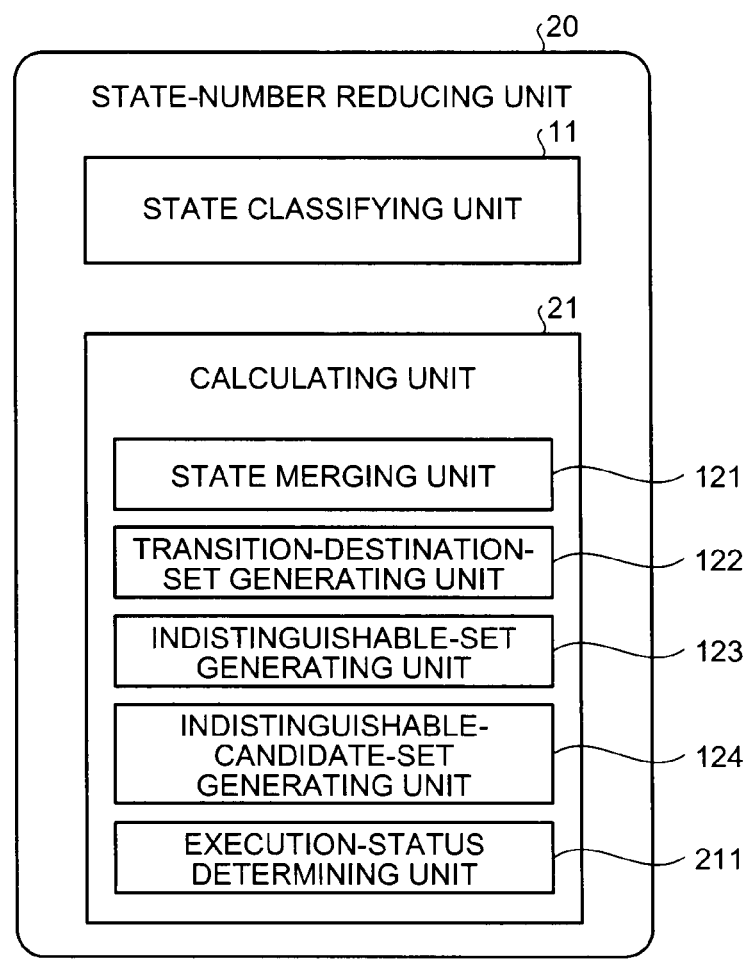
FIG. 26 is a block diagram of a functional configuration of an information processing apparatus according to a second embodiment of the present invention.

FIG. 26 is a block diagram of a functional configuration of an information processing apparatus according to the second embodiment. As shown in FIG. 26, the information processing apparatus includes a state-number reducing unit 20 as a functional unit that is realized by the CPU 1 in cooperation with the predetermined program previously stored in the ROM 4 or the storage unit 6.

The state-number reducing unit 20 includes the state classifying unit 11 and a calculating unit 21. The state-number reducing unit 20 executes the main program "simin" to incrementally reduce the number of states in the DFA as the processing target.

The calculating unit 21 includes the state merging unit 121, the transition-destination-set generating unit 122, the indistinguishable-set generating unit 123, the indistinguishable-candidate-set generating unit 124, and an execution-status determining unit 211 as shown in FIG. 26. The calculating unit 21 executes a subprogram "search_equiv2" corresponding to the subprogram "search_equiv", which will be explained later, to merge indistinguishable states included in the DFA as the processing target into one state. The execution-status determining unit 211 is a functional unit realized by a subprogram "find_src_in_D" explained later. An operation of the execution-status determining unit 211 is explained later.

FIG. 27 is a diagram illustrating an example of a pseudocode of the subprogram "search_equiv2". Processes at Steps N401 to N411 are the same as those at Steps N221 to N231 of "search_equiv".

At Step N412, the calculating unit 21 sets $b_{found}$ in which execution statuses in processes at Steps N418 to N420 explained later are recorded, to be "false". The calculating unit 21 then determines whether the size of the set $\gamma_n$ of transition destination states is the same as that of the set $\gamma$ (Step N413), and performs processes at Step N414 to N421 when they are the same.

At Step N414, the calculating unit 21 executes the subprogram "find_src_in_D" by using the execution-status determining unit 211, to obtain dependence relations in which the states included in the set $\gamma_n$ are dependence source states, from the table D. The subprogram "find_src_in_D" is explained later.

The calculating unit 21 then determines dependence destination states of the states included in the set $\gamma$ (Step N415). Specifically, it is assumed that when a state included in the set $\gamma$, that is, a state included in the set g is q, a transition destination of the state q on an input symbol σ is $q_s$, and a dependence destination state of the state $q_s$ is $q_d$, a dependence destination state of the state q is $q_d$. The calculating unit 21 obtains a state $q_d$ for each of the states included in the set g and generates a set ψ of 2-tuples $(q,q_d)$.

The calculating unit 21 then generates a set $\gamma_d$ of the dependence destination states corresponding to the elements of the set $\gamma$ by using the sets $\gamma$ and ψ (Step N416). The calculating unit 21 determines whether the set $\gamma_d$ is in the stack S (Step N417), and performs processes at Steps N418 to N420 when determining that the set $\gamma_d$ is in the stack S.

At Step N418, the calculating unit 21 adds a 2-tuple of ψ and $x_{level}$ to the set $\Psi_{sc}$. The calculating unit 21 then determines whether $x_{level}$ is equal to the size of the stack S (Step N419), and performs a process at Step N410 only when they are equal. At Step N420, the calculating unit 21 adds a state set including the dependence source states included in ψ to the set η. Upon completion of the processes at Steps N418 to N420, the calculating unit 21 sets $b_{found}$ to be "true" (Step N421).

At subsequent Step N422, the calculating unit 21 determines whether $b_{found}$ is "false" and performs the same processes as those at Steps N232 to N253 of "search_equiv", which have been explained in the first embodiment, when it is determined that $b_{found}$ is "false" (Step N423). While "search_equiv" is recursively executed at Step N236 of "search_equiv", "search_equiv2" is executed instead in the second embodiment.

A process at Step N424 is the same as that at Step N254 of "search_equiv" explained in the first embodiment, and accordingly the calculating unit 21 performs the processing as explained in the first embodiment.

A process at Step N425 is the same as those at Steps N255 to N267 of "search_equiv" explained in the first embodiment, and accordingly the calculating unit 21 performs the processing as explained in the first embodiment. The process at Step N425 is a group of processes that are performed only when the set $\Sigma_g$ is not an empty set φ in condition determination at Step N404.

A process at Step N426 is the same process as those at Steps N268 to N271 of "search_equiv" explained in the first embodiment, and accordingly the calculating unit 21 performs the processing as explained in the first embodiment.

The subprogram "find_src_in_D" at Step N414 is explained with reference to FIG. 28.

The execution-status determining unit 211 first removes the path indices from the set $\gamma_n$ to obtain a set $g_n$ of states (Step N431). The execution-status determining unit 211 then performs processes at Steps N433 to N436 for each element $(x_{level}, y)$ included in the table D according to foreach statement at Step N432.

At Step N433, the execution-status determining unit 211 performs processes at Steps N434 to N436 for each element ψ in y according to foreach statement. At Step N434, the execution-status determining unit 211 extracts only dependence source states out of 2-tuples (dependence source state, dependence destination state) as elements of ψ to obtain a state set $g_s$. The execution-status determining unit 211 then determines whether the set $g_n$ is equal to the set $g_s$ (Step N435), and returns to Step N414 of "search_equiv2" using a 2-tuple of ψ and $x_{level}$ at that time as a return value when it is determined that the sets $g_n$ and $g_s$ are equal (Step N436).

Meanwhile, when the condition at Step N435 is not met in all repetitions of the processes at Steps N432 and N433, a process at Step N437 is performed. In this case, the execution-status determining unit 211 returns to Step N414 of "search_equiv2" with a 2-tuple (φ,0) of empty set and zero as a return value (Step N437).

These processes eliminate the need to perform the algorithm "search_equiv2" again for states that have already turned out to be on the cyclic path. Therefore, when there are many states on the cyclic path, the state-number reducing process can be achieved in a smaller amount of processing than in the first embodiment. When the state-number reducing process is performed to the end without interruption, a DFA having a minimal number of states can be obtained.

In the case of the DFA, even when there are plural final states, the final states can be merged into one state when the sets of input symbols of outgoing transitions are the same. However, when weights are assigned to the final states like in a weighted finite state automaton, the final states assigned with different weights are distinguishable and therefore cannot be merged into one. The reason is that when the states are merged into one, a resultant weight may be changed.

In a third embodiment of the present invention, a configuration that can be applied to a case in which there are plural types of final states, in other words, the final states have additional information is explained. Like constituent elements as those in the first embodiment are denoted by like reference characters and explanations thereof will be omitted.

Figures 28, 29:
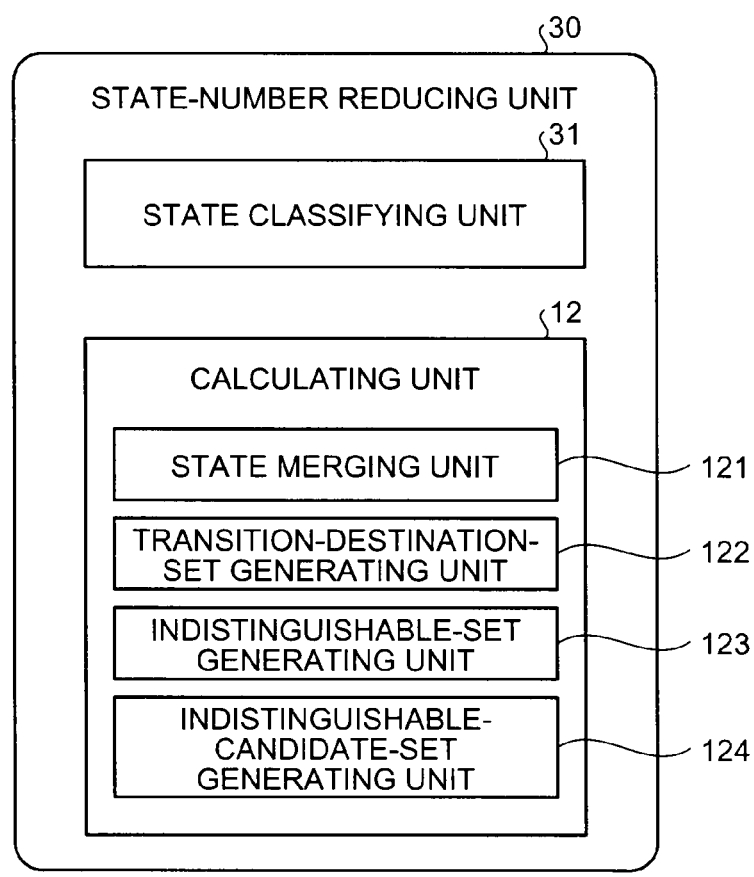
FIG. 28 is a diagram illustrating an example of a pseudocode of a subprogram "find_src_in_D" shown in FIG. 27.
FIG. 29 is a block diagram of a functional configuration of an information processing apparatus according to a third embodiment of the present invention.

FIG. 29 is a block diagram of a functional configuration of an information processing apparatus according to a third embodiment. As shown in FIG. 29, the information processing apparatus includes a state-number reducing unit 30 as a functional unit that is realized by the CPU 1 in cooperation with the predetermined program previously stored in the ROM 4 or the storage unit 6.

A state classifying unit 31 classifies states included in the DFA as the processing target into states having the same state finality, the same type of input symbols associated with outgoing transitions, and the same additional information of final states. The additional information can be the weight as above mentioned, or a distance or cost that can be numerically expressed, for example. The additional information can be a character, a symbol, a character string, a symbol string, or the like.

Figures 30, 31:
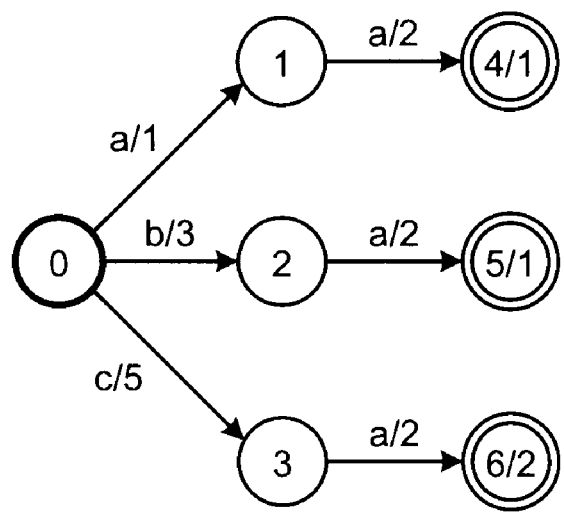
FIG. 30 is a diagram illustrating an example of a pseudocode of a subprogram "create_class" according to the third embodiment.
FIG. 31 is a diagram illustrating an example of a weighted DFA.

In the third embodiment, a set of additional information of a state q∈F is denoted by ρ(q) because cases in which there are plural types of additional information need to be considered. When the state q is a final state, additional information of the final state is assigned, and when the state q is not a final state, ρ(q)=φ. A pseudocode of "create_class" that is adapted to use ρ(q) is shown in FIG. 30.

The state classifying unit 31 first initializes the set G having as an element a state set to be used as a return value, to be an empty set φ, and initializes a table C in which a 2-tuple including a set of input symbols of outgoing transitions and additional information is stored associated with a state set, to be an empty set φ (Step N501).

The state classifying unit 31 then performs processes at Steps N503 and N504 for each state q included in Q according to foreach statement at Step N502. At Step N503, the state classifying unit 31 generates a set of input symbols associated with outgoing transitions from the state q and assigns the generated set to the set $\Sigma_q$. The state classifying unit 31 then adds the state q to the state set that is stored in the table C associated with the 2-tuple of the set $\Sigma_q$ and the set ρ(q) of additional information (Step N504).

The state classifying unit 31 then performs processes at Steps N506 and N507 for each element in the table C according to foreach statement at Step N505. The state classifying unit 31 uses only the state set g that is associated with the 2-tuple including the set of input symbols of the outgoing transitions and the set of additional information in the processes at Steps N506 and N507.

At Step N506, the state classifying unit 31 determines whether the size of the set g is equal to or larger than two and adds the set g to the set G when determining that the size is equal to or larger than two (Step N507). The state classifying unit 31 finally returns the set G as a result of the processing of "create_class" and returns back to Step N202 of the main program "simin".

Figure 32:
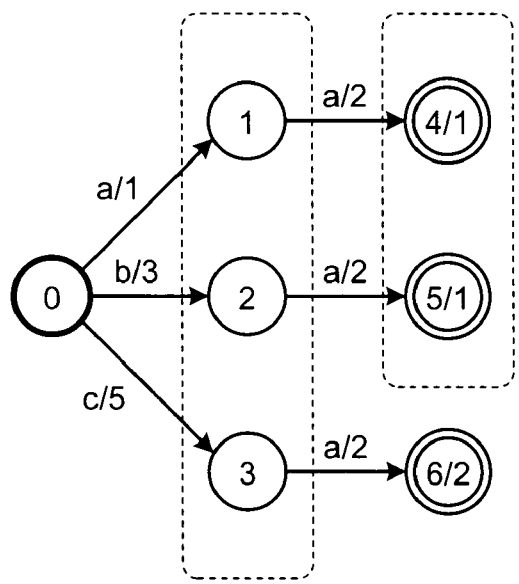
FIG. 32 is a diagram illustrating a configuration of the weighted DFA shown in FIG. 31 after state classification.

An operation of the state-number reducing unit 30 according to the third embodiment is explained below with reference to FIGS. 31 to 33. In FIG. 31, an input symbol assigned to each transition is shown on the left of "/", and a weight is shown on the right. A state index is shown on the left of "/" of a final state, and a weight of the final state is shown on the right. Sets of additional information of the states are ρ(0)=φ, ρ(1)=φ, ρ(2)=φ, ρ(3)=φ, ρ(4)={1}, ρ(5)={1}, and ρ(6)={2}.

When an input symbol string ba is input to the weighted DFA as shown in FIG. 31, transitions from the state 0 to the state 2 and then to the state 5 occur. Weights assigned to the transitions are 3 and 2, and a weight of a final state is 1. Addition of these weights results in 3+2+1+32 6. This means that a weight 6 is obtained when the input symbol string ba is input to the weighted DFA.

A state-number minimizing process in the third embodiment is performed assuming a pair of input symbol and weight assigned to a transition as one input symbol. For example, in a case of an input symbol assigned to a transition from a state 0 to a state 1, a/1 is assumed as one input symbol.

The number of states in the DFA shown in FIG. 31 is reduced by using a state-number reducing method according to the third embodiment. In the main program "simin", the subprogram "create_class" as explained with reference to FIG. 30 is first executed. This results in G={{1, 2, 3}, {4, 5}}. This status is shown in FIG. 32. A group enclosed in a dotted line corresponds to a class, and it is found that the states 1, 2, and 3, and the states 4 and 5 fall into one class, respectively.

The remaining processes of the main program "simin" can be performed in the same manner as in the first embodiment. The states 4 and 5 are merged into one, and the states 1 and 2 are merged into one. As a result, the DFA shown in FIG. 31 becomes one as shown in FIG. 33.

Figure 33:
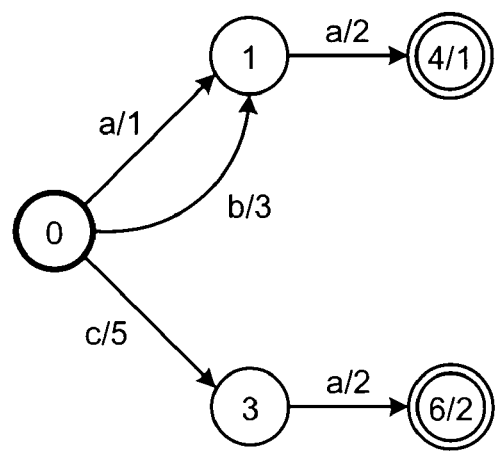
FIG. 33 is a diagram illustrating a configuration of the weighted DFA shown in FIG. 31 after state reduction.

As is also apparent from FIG. 33, when the input symbol string ba is input to the DFA after minimization, transitions from the state 0 to the state 1 and then to the transition 4 occur, and the total weight can be calculated by 3+2+1+, resulting in 6. Accordingly, it is found that the same weight before the minimization is obtained.

As described above, according to the third embodiment, even when the final states have types added thereto like in the weighted finite state automaton, the number of states can be incrementally reduced without merging the states having different final states into one.

In a fourth embodiment of the present invention, an example in which a DFA having no cyclic path (acyclic DFA) is a processing target is explained. Like constituent elements as those in the first embodiment are denoted by like reference characters and explanations thereof will be omitted.

Figures 34, 35:
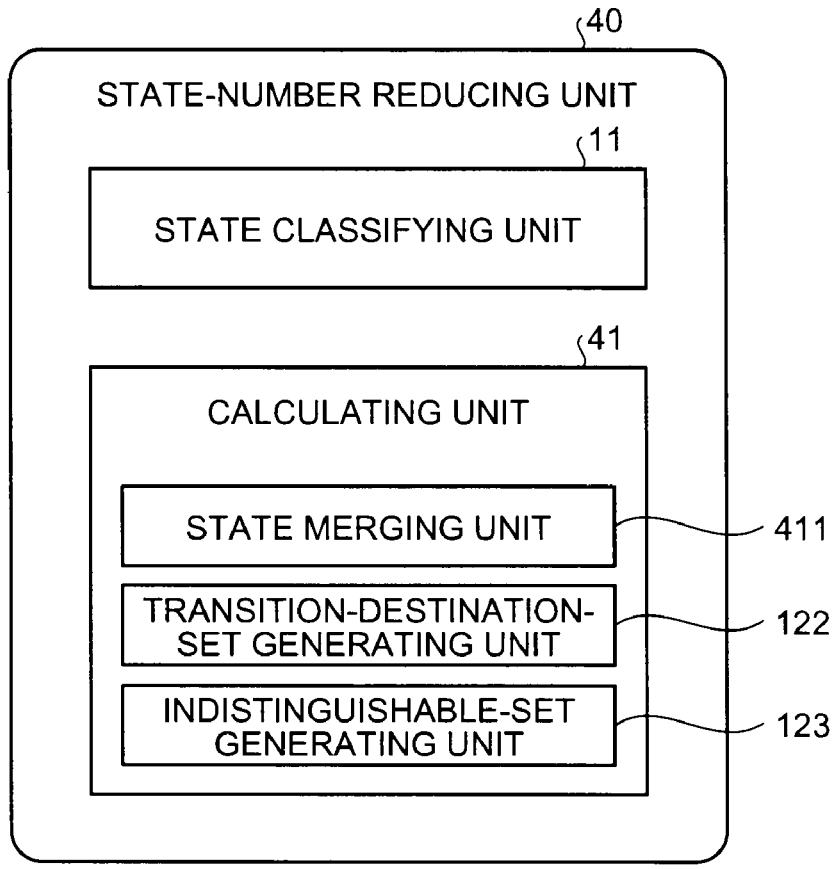
FIG. 34 is a block diagram of a functional configuration of an information processing apparatus according to a fourth embodiment of the present invention.
FIG. 35 is a diagram illustrating an example of a pseudocode of a main program "simin_ac" executed by a state-number reducing unit shown in FIG. 34.

FIG. 34 is a block diagram of a functional configuration of an information processing apparatus according to a fourth embodiment. As shown in FIG. 34, the information processing apparatus according to the fourth embodiment includes a state-number reducing unit 40 as a functional unit that is realized by the CPU 1 in cooperation with the predetermined program previously stored in the ROM 4 or the storage unit 6.

The state-number reducing unit 40 includes the state classifying unit 11 and a calculating unit 41, and incrementally reduces the number of states in an acyclic DFA as a processing target by executing a main program "simin_ac", which will be explained later. The "acyclic DFA" means a DFA having no cyclic path. "Having no cyclic path" indicates that there is no input symbol string w∈Σ*\{ε} that meets δ(q,w)=q with respect to all states q∈Q. Because w∈Σ*\{ε}, w does not include an empty input symbol string.

The calculating unit 41 includes a state merging unit 411, the transition-destination-set generating unit 122, and the indistinguishable-set generating unit 123, as shown in FIG. 34. The calculating unit 41 merges indistinguishable states included in the acyclic DFA as the processing target into one state, by executing a subprogram "search_equiv_ac" explained later, corresponding to the subprogram "search_equiv".

The state merging unit 411 is a functional unit that is realized by a subprogram "merge_states_ac" explained later. An operation of the state merging unit 411 is explained later.

The acyclic DFA as the processing target in the fourth embodiment has no cyclic path, and thus processes associated with a cyclic path are not required. Accordingly, "simin_ac", "search_equiv_ac", and "merge_states_ac" explained later are obtained by deleting the processes associated with the cyclic path from "simin", "search_equiv", and "merge_states" which are explained in the first embodiment, respectively. These subprograms are explained below in turn.

FIG. 35 is a diagram illustrating an example of a pseudocode of the main program "simin_ac" executed by the state-number reducing unit 40. The state-number reducing unit 40 first classifies the states included in the acyclic DFA as the processing target based on finality and input symbols of outgoing transitions by using the state classifying unit 11, and assigns a result of the classification to the set G (Step N601), like in the first embodiment.

The state-number reducing unit 40 then repeatedly performs processes at Steps N603 and N604 until the set G becomes an empty set φ (Step N602). At Step N603, the state-number reducing unit 40 selects an arbitrary element from the set G to generate a set g. The order in which the elements are selected does not matter. For example, the elements can be selected in the order of ascending or descending size of the set g.

At subsequent Step N604, the state-number reducing unit 40 executes the subprogram "search_equiv_ac" by using the set g as a first argument and the set G as a second argument, by means of the calculating unit 41. A return value of the subprogram "search_equiv_ac" is a set of state sets, and the state-number reducing unit 40 assigns the return value to the set G. Unlike the first embodiment, the stack S is not required in the fourth embodiment. The path index is not required either, and accordingly "add_path_index" needs not to be used.

The subprogram "search_equiv_ac" executed at Step N604 is explained with reference to FIG. 36.

The calculating unit 41 first collects all input symbols associated with outgoing transitions from the states included in the set g, and assigns the input symbols to the set $\Sigma_g$ (Step N611). The calculating unit 41 then determines whether the set $\Sigma_g$ is an empty set φ (Step N612), and performs a process at Step N613 when the set $\Sigma_g$ is an empty set φ. When determining that the set $\Sigma_g$ is not an empty set φ, the calculating unit 41 performs processes from Step N614.

At Step N613, the calculating unit 41 executes the subprogram "merge_states_ac" by using the state merging unit 411 to merge the states included the set g into one state and assign states that become unneeded due to the merge to the set $g_{erase}$. The subprogram "merge_states_ac" is explained later.

Meanwhile, at Step N615, the calculating unit 41 brings the set H that is to be used in a subsequent process into an empty set φ. The calculating unit 41 then performs processes at Steps N617 to N628 for each input symbol in the set $\Sigma_g$ according to foreach statement at Step N616.

At Step N617, the calculating unit 41 brings the set η having state sets as elements to an empty set φ. The calculating unit 41 then obtains a set $g_n$ of transition destination states on an input symbol σ from the states included in the set g. That is, $g_n = \delta(g, \sigma)$.

The calculating unit 41 then performs processes at Steps N620 to N622 for each element in the set G according to foreach statement at Step N619. The calculating unit 41 calculates an intersection set $g_{ni}$ of the element g' in the set G and the set $g_n$ at Step N620, and recursively executes the subprogram "search_equiv_ac" only when the size of the set $g_{ni}$ is equal to or larger than two (Step N622). At that time, the set $g_{ni}$ is provided as a first argument, and the set G is provided as a second argument. When returning from the recursive processing, the calculating unit 41 obtains a return value as the set G.

There is a possibility that the states may be merged during the recursive execution of the subprogram "search_equiv_ac". Therefore, the calculating unit 41 updates the set $g_n$ at Step N623, like at Step N618. When the process at Step N622 is not performed, the process at Step N623 needs not to be performed.

The calculating unit 41 then performs processes at Steps N625 to N627 for each state $q_n$ in the set $g_n$ according to foreach statement at Step N624, thereby finding indistinguishable states with respect to transitions associated with the input symbol σ.

The calculating unit 41 obtains a set of states included in the set g that transit to the state $q_n$ on the input symbol σ, as the set $g_s$ (Step N625). The calculating unit 41 then determines whether the size of the set $g_s$ is equal to or larger than two (Step N626), and adds the set $g_s$ to the set 1 when determining that two or more states are included in the set $g_s$ (Step N627).

Upon completion of the processes at Steps N625 to N627 for all the states included in the set $g_n$, the calculating unit 41 adds the set η at that time to the set H (Step N628). Upon completion of the processes at Steps N617 to N628 for all the input symbols included in the set $\Sigma_g$, the calculating unit 41 executes the subprogram "search_sharable_state" by using the indistinguishable-set generating unit 123, to obtain a set of indistinguishable states as the set $G_{share}$ (Step N629).

The calculating unit 41 then executes the subprogram "merge_states_ac" by using the state merging unit 411, to merge the indistinguishable states into one and obtain a set of states that have become unneeded due to the merge as the set $g_{erase}$ (Step N630).

At subsequent Step N631, the calculating unit 41 generates the set G' that meets the following two conditions from the set G. Condition 1: Elements in the set G corresponding to the set g are not included in the set G'. Condition 2: States that have become unneeded and are included in the set $g_{erase}$ are removed from the elements of the set G, and only elements that have accordingly the sizes equal to or larger than two are included in the set G'.

The calculating unit 41 then returns the set G' obtained at Step N631 as a return value to the process at Step N604, and ends the processing of "search_equiv_ac".

The subprogram "merge_states_ac" that is executed at Step N613 or N630 is explained with reference to FIG. 37.

The state merging unit 411 first brings $Q_e$ in which unneeded states are stored, to an empty set φ (Step N641). The state merging unit 411 then performs processes at Steps N643 to N646 for each element $g_s$ in the set $G_{share}$ according to foreach statement at Step N642.

The state merging unit 411 selects a state from the set $g_s$ to be kept when states are merged into one state as a representative state r at Step N643. The state to be selected does not matter, and a state having a smallest state index can be selected to be kept, for example.

The state merging unit 411 then performs processes at Steps N645 and N646 for each state $q_e$ except for the state r selected from the set $g_s$ at Step N643, according to foreach statement at Step N644.

At Step N645, the state merging unit 411 merges the state $q_e$ into the state r selected at Step N643. At subsequent Step N646, the state merging unit 411 adds states $q_e$ that have become unneeded due to the merge to $Q_e$.

Upon completion of the processes at Steps N643 to N646 for all the elements in the set $G_{share}$, the state merging unit 411 returns the processing to a caller with the set $Q_e$ of the unneeded states as a return value (step N647), thereby ending the processing of "merge_states_ac".

With the above processes, the state-number reducing process for the acyclic DFA is completed. As described above, according to the fourth embodiment, the processes for the cyclic path are not required, and accordingly the number of states in the acyclic DFA can be reduced more efficiently than in the first embodiment.

Also to a DFA in which there are plural types of final states as explained in the third embodiment, the configuration of the fourth embodiment can be applied when the DFA has no cyclic path. Specifically, this can be realized by replacing the subprogram "create_class" to be executed at Step N601 of the main program "simin_ac" with that explained in the third embodiment.

In the fifth embodiment of the present invention, a configuration that enables to interrupt reduction of the number of states in the DFA at an arbitrary point in time is explained. Like constituent elements as those in the first embodiment are denoted by like reference characters and explanations thereof will be omitted.

Figures 37, 38:
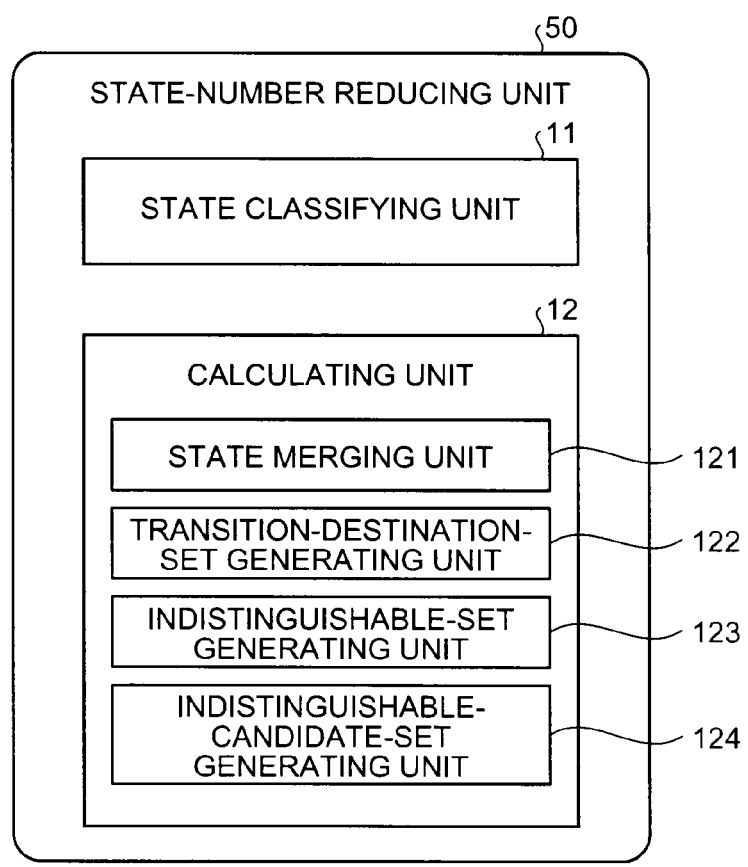
FIG. 37 is a diagram illustrating an example of a pseudocode of a subprogram "merge_states_ac" shown in FIG. 36.
FIG. 38 is a block diagram of a functional configuration of an information processing apparatus according to a fifth embodiment of the present invention.

FIG. 38 is a block diagram of a functional configuration of an information processing apparatus according to a fifth embodiment. As shown in FIG. 38, the information processing apparatus includes a state-number reducing unit 50 as a functional unit that is realized by the CPU 1 in cooperation with the predetermined program previously stored in the ROM 4 or the storage unit 6.

The state-number reducing unit 50 includes the state classifying unit 11 and the calculating unit 12, and executes the main program "simin" as described above to incrementally reduce the number of states in the DFA as a processing target.

The state-number reducing unit 50 monitors an execution status of the main program "simin" executed by the unit 50 itself. Upon reception of an interruption of a state-number reducing process through the operating unit 2 or the like, the state-number reducing unit 50 determines whether an interruptible point is currently processed, and interrupts the state-number reducing process when the interruptible point is currently processed. The "interruptible point" indicates a step position in which, when the state-number reducing process is interrupted, a DFA at the interruption can be obtained.

Specifically, the state-number reducing unit 50 determines a non-interruptible point during execution of the processes at Steps N304 to N313 of the subprogram "merge_states" or the subprogram "merge". In this case, the state-number reducing unit 50 continues the processing up to an interruptible point, interrupts the processing when the interruptible point is reached, and records the DFA at that time in the storage unit 6. When the processing is interrupted at any point other than the non-interruptible point, it is possible to obtain the DFA at the interruption.

Figure 39:
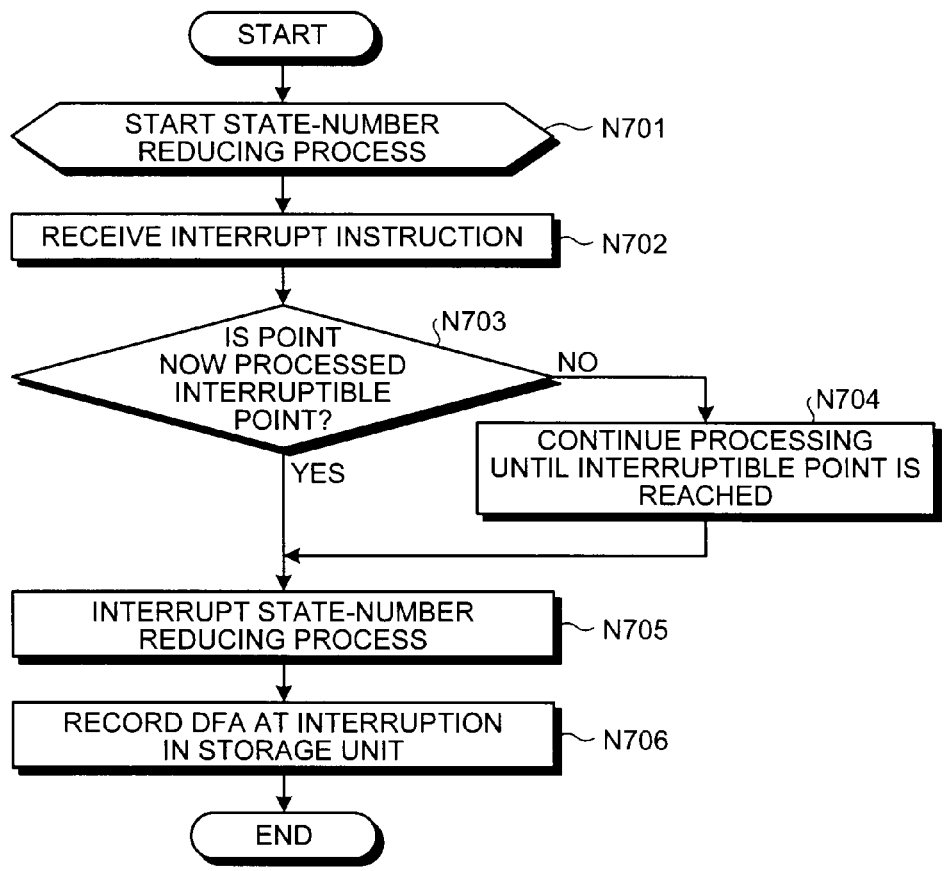
FIG. 39 is a flowchart of an interruption-control process procedure performed by a state-number reducing unit shown in FIG. 38.

An operation of the state-number reducing unit 50 is explained with reference to FIG. 39. FIG. 39 is a flowchart of an interruption-control process procedure performed by the state-number reducing unit 50. The interruption control process is performed independently of the state-number reducing process and performed at occurrence of an interrupt according to an interruption instruction for the state-number reducing process, input through the operating unit 2 or the like.

When reduction of the number of states in the DFA stored in the storage unit 6 is instructed by a user through the operating unit 2 or the like, the state-number reducing unit 50 executes a series of programs starting from the main program "simin" as explained in the first embodiment (Step N701).

Upon receipt of an interruption instruction for the processing through the operating unit 2 or the like during execution of the series of programs (Step N702), the state-number reducing unit 50 determines whether a point currently processed is an interruptible point (Step N703). When determining that an interruptible point is currently processed (YES at Step N703), the state-number reducing unit 50 promptly interrupts the processing (Step N705) and proceeds to a process at Step N706.

Meanwhile, when determining that a non-interruptible point is processed (NO at Step N703), the state-number reducing unit 50 continues the processing up to an interruptible point (Step N704), and interrupts the processing when an interruptible point is reached (Step N705).

At subsequent Step N706, the state-number reducing unit 50 records a DFA at the interruption of the processing in the storage unit 6 (Step N706) and ends the processing.

As described above, according to the fifth embodiment, the state-number reducing process can be interrupted at an arbitrary timing, and a DFA having the number of states that has been reduced by that time can be obtained. Therefore, even when the time to reduce the number of states is limited and accordingly the minimization cannot be completed due to the limitation, a DFA having a reduced number of states as compared to the original number of states can be obtained.

When the same configuration as in the fifth embodiment is applied to the second or third embodiment, the state-number reducing process can be interrupted at an arbitrary timing. When the same configuration as in the fifth embodiment is applied to the fourth embodiment, the state-number reducing process can be also interrupted at an arbitrary timing. However, non-interruptible points are the processes at Steps N644 to N646 of the subprogram "merge_states_ac" and the subprogram "merge".

In the fifth embodiment, the state-number reducing process is interrupted according to an instruction signal input through the operating unit 2. However, the present invention is not limited thereto. For example, a timer unit 8 that performs timing can be provided in the information processing apparatus, and the state-number reducing process can be interrupted according to a signal from the timer unit 8, as shown in FIG. 40.

Figure 40:
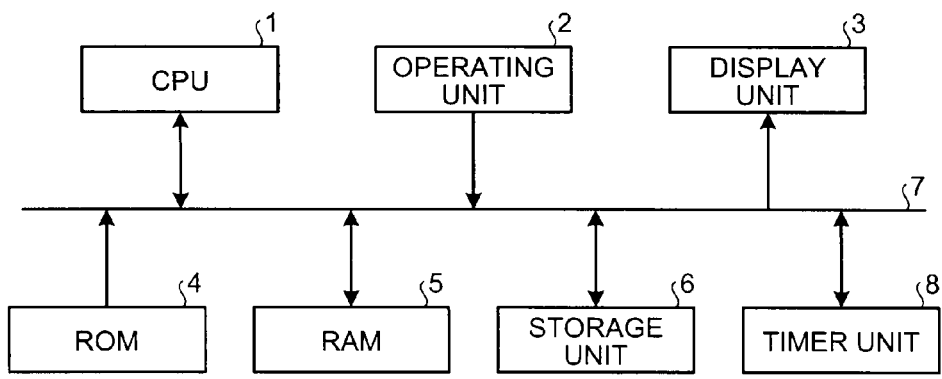
FIG. 40 is a block diagram of another hardware configuration example of the information processing apparatus.

In the configuration shown in FIG. 40, the user instructs an upper limit of a processing time through the operating unit 2 to set the upper limit in the timer unit 8 before the state-number reducing process is started. When the user instructs the state-number reducing process for a DFA, the state-number reducing unit 50 starts executing a series of the programs starting from the main program "simin" and simultaneously the timer unit 8 starts timing. When a signal indicating that the set time has elapsed before the state-number reducing process is completed is transmitted from the timer unit 8 to the state-number reducing unit 50, the state-number reducing unit 50 starts the interruption control process as described above, to interrupt the state-number reducing process.

While exemplary embodiments of the present invention have been explained above, the invention is not limited thereto, and various modifications, substitutions, and additions can be made without departing from the scope of the present invention.

For example, it is possible to provide the programs associated with the processes in the above embodiments by storing the programs in a computer-readable storage medium. Any storage medium that can store therein the programs and is computer readable, such as a magnetic disk, an optical disk (such as compact-disk read only memory (CD-ROM), a CD-recordable (CD-R), or a digital versatile disk (DVD)), a magneto-optical disk (MO), or a semiconductor memory can be used as the storage medium and the storage format thereof is not particularly specified.

The programs associated with the processes in the above embodiments can be stored in a computer connected to a network such as the Internet, and downloaded via the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a state classifying unit that classifies first states included in a deterministic finite automaton into state sets, the state sets having same input symbols associated with outgoing transitions and same finality indicating whether a state in the first states is a final state;
a calculating unit that calculate, for each of the state sets, an intersection set between each of the state sets and a set of transition destination states which is obtained by translating each of states included in the state sets;
a repeating unit that repeats a calculation of the intersection set, until the number of states included in the intersection set becomes equal to one, while regarding the set of the transition destination states for each of the input symbol included in the intersection set as new state sets; and
a state merging unit that merges plural indistinguishable states into one state by tracing a route in a reverse direction to a transition direction, when the number of states has become equal to one.

2. The apparatus according to claim 1, wherein the state merging unit merges, among the states included in the intersection set, states having the same transition destination states on an input symbol or states having no transition destination state, into one state.

3. The apparatus according to claim 1, wherein
the repeating unit stores each state included in the state set as a processing target in a stack, and performs determination of a cyclic path based on whether an element of the intersection set obtained in repeatedly performs the calculation is in the stack, and
the state merging unit merges the plural indistinguishable states into one state by tracing a route from a state determined to be on a cyclic path by the repeating unit in the reverse direction to the transition direction.

4. The apparatus according to claim 3, wherein
the repeating unit stores a start state of the cyclic path among the states on the cyclic path in the stack, with states other than the start state being associated with the start state, and
the state merging unit merges states corresponding to the start state into one state and, along therewith, merges the other states stored in the stack with being associated with the start state into one state.

5. The apparatus according to claim 1, wherein the state classifying unit classifies the states included in the deterministic finite automaton into state sets, the state sets including the first states having the same input symbols associated with outgoing transitions, the same finality indicating whether the state in the first states is the final state, and same types of the final states.

6. The apparatus according to claim 5, wherein the types of the final states are weights assigned to the final states.

7. The apparatus according to claim 1, further comprising:
a receiving unit that receives an interruption of processing; and
a control unit that determines points subjected to the processing in the state classifying unit, the repeating unit, and the state merging unit at a timing when the receiving unit receives the interruption of the processing, and interrupts the processing only when determining that an interruptible point is processed.

8. The apparatus according to claim 7, wherein the control unit continues the processing until an interruptible point is reached when determining that a non-interruptible point is processed, and interrupts the processing when the interruptible point is reached.

9. An information processing method comprising:
classifying first states included in a deterministic finite automaton into state sets, the state sets having same input symbols associated with outgoing transitions and same finality indicating whether a state in the first states is a final state;
calculating, for each of the state sets, an intersection set between each of the state sets and a set of transition destination states which is obtained by translating each of states included in the state set;
repeating a calculation of the intersection set, until the number of states included in the intersection set becomes equal to one, while regarding the set of the transition destination states for each of the input symbol included in the intersection set as new state sets; and
merging plural indistinguishable states into one state by tracing a route in a reverse direction to a transition direction, when the number of states has become equal to one.

10. A computer program product having a computer readable medium including programmed instructions for reduction in the number of states in a deterministic finite state automaton, wherein the instructions, when executed by a computer, cause the computer to perform:
classifying first states included in a deterministic final automaton into state sets, the state sets having same input symbols associated with outgoing transitions and same finality indicating whether a state in the first states is a final state,
calculating, for each of the state sets, an intersection set between each of the state sets and a set of transition destination states which is obtained by translating each of states included in the state sets;
repeating a calculation of the intersection set, until the number of states included in the intersection set becomes equal to one, while regarding the set of the transition destination states for each of the input symbol included in the intersection set as new state sets; and
merging plural indistinguishable states into one state by tracing a route in a reverse direction to a transition direction, when the number of states has become equal to one.

* * * * *